US012770914B2

(12) United States Patent
Fujii et al.

(10) Patent No.: US 12,770,914 B2
(45) Date of Patent: Oct. 20, 2026

(54) SULFIDE-BASED SOLID ELECTROLYTE USED IN LITHIUM ION SECONDARY BATTERY, METHOD FOR PRODUCING SAME, AND LITHIUM ION SECONDARY BATTERY

(71) Applicant: AGC Inc., Tokyo (JP)

(72) Inventors: Naoki Fujii, Tokyo (JP); Tetsushi Shobudani, Tokyo (JP); Manabu Nishizawa, Tokyo (JP); Hiroaki Tanaka, Tokyo (JP); Kosho Akatsuka, Tokyo (JP)

(73) Assignee: AGC Inc., Tokyo (JP)

( * ) Notice: Subject to any disclaimer, the term of this patent is extended or adjusted under 35 U.S.C. 154(b) by 671 days.

(21) Appl. No.: 18/150,939

(22) Filed: Jan. 6, 2023

(65) Prior Publication Data

US 2023/0163353 A1 May 25, 2023

Related U.S. Application Data

(63) Continuation of application No. PCT/JP2021/025677, filed on Jul. 7, 2021.

(30) Foreign Application Priority Data

Jul. 7, 2020 (JP) ................................ 2020-117194
Oct. 13, 2020 (JP) ................................ 2020-172693
May 21, 2021 (JP) ................................ 2021-086406

(51) Int. Cl.

| | |
|---|---|
| ***H01M 6/18*** | (2006.01) |
| ***H01M 4/04*** | (2006.01) |
| ***H01M 4/36*** | (2006.01) |
| ***H01M 4/38*** | (2006.01) |
| ***H01M 4/525*** | (2010.01) |
| ***H01M 4/62*** | (2006.01) |
| ***H01M 10/0525*** | (2010.01) |
| ***H01M 10/0562*** | (2010.01) |
| *H01M 4/02* | (2006.01) |

(52) U.S. Cl.

CPC ..... *H01M 10/0562* (2013.01); *H01M 4/0433* (2013.01); *H01M 4/366* (2013.01); *H01M 4/382* (2013.01); *H01M 4/525* (2013.01); *H01M 4/625* (2013.01); *H01M 10/0525* (2013.01); *H01M 2004/028* (2013.01); *H01M 2300/0068* (2013.01)

(58) Field of Classification Search

CPC ......... H01M 10/0562; H01M 10/0561; H01M 10/0525; H01M 10/052; H01M 4/0433; H01M 4/366; H01M 4/382; H01M 4/525; H01M 4/625; H01M 2004/028; H01M 2300/0068

See application file for complete search history.

(56) References Cited

U.S. PATENT DOCUMENTS

| | | | | |
|---|---|---|---|---|
| 10,826,115 | B2 * | 11/2020 | Holme ................ | H01M 10/056 |
| 11,114,691 | B2 * | 9/2021 | Choi .................. | H01M 10/052 |
| 11,139,479 | B2 * | 10/2021 | Chao ...................... | C01B 33/00 |
| 2015/0093652 | A1 | 4/2015 | Aihara et al. | |
| 2016/0156064 | A1 | 6/2016 | Miyashita et al. | |
| 2017/0187066 | A1 | 6/2017 | Tsujimura et al. | |
| 2018/0069262 | A1 | 3/2018 | Utsuno et al. | |
| 2018/0138546 | A1 | 5/2018 | Sung et al. | |
| 2018/0166740 | A1 | 6/2018 | Iwasaki et al. | |
| 2018/0366777 | A1 | 12/2018 | Sasaki | |
| 2019/0074544 | A1 | 3/2019 | Senga et al. | |
| 2020/0087155 | A1 | 3/2020 | Rupert | |
| 2020/0381772 | A1 | 12/2020 | Kim et al. | |
| 2021/0020984 | A1 | 1/2021 | Ito et al. | |
| 2021/0119252 | A1 | 4/2021 | Sung et al. | |
| 2022/0006117 | A1 | 1/2022 | Takahashi et al. | |
| 2022/0109184 | A1 | 4/2022 | Tsujimura et al. | |
| 2023/0037508 | A1 | 2/2023 | Nakayama et al. | |

FOREIGN PATENT DOCUMENTS

| | | | |
|---|---|---|---|
| CN | 111448702 | A | 7/2020 |
| EP | 4 084 123 | A1 | 11/2022 |
| JP | 6-115911 | A | 4/1994 |
| JP | 2012-43646 | A | 3/2012 |
| JP | 2012-43654 | A | 3/2012 |
| JP | 2012-54212 | A | 3/2012 |
| JP | 2013-137889 | A | 7/2013 |

(Continued)

OTHER PUBLICATIONS

Extended European Search Report issued Sep. 18, 2024, in corresponding European Patent Application No. 21849673.5, 8 pages.
Extended European Search Report issued Sep. 25, 2024, in corresponding European Patent Application No. 21880172.8, 9 pages.
International Search Report and Written Opinion issued Dec. 28, 2021 in PCT/JP2021/037974, 5 pages.
Extended European Search Report issued Jul. 24, 2024 in European Patent Application No. 21837335.5, 9 pages.
Yu, C. et al., "Facile Synthesis toward the Optimal Structure-Conductivity Characteristics of the Argyrodite $Li_6PS_5Cl$ Solid-State Electrolyte," Applied Materials & Interfaces, vol. 10, 2018, pp. 33296-33306, XP093182711.

(Continued)

*Primary Examiner* — Raymond Alejandro
(74) *Attorney, Agent, or Firm* — Oblon, McClelland, Maier & Neustadt, L.L.P.

(57) ABSTRACT

A sulfide solid electrolyte to be used in a lithium-ion secondary battery, including: a crystal phase; and an anion existing in a crystal structure of the crystal phase, in which the crystal phase includes an argyrodite crystal containing Li, P, S, and Ha; Ha is at least one element selected from the group consisting of F, Cl, Br, and I; the anion includes an oxide anion having a Q0 structure having an M-O bond that is a bond of M and O; and M is at least one element selected from the group consisting of metal elements and semimetal elements belonging to Groups 2 to 14 of a periodic table.

11 Claims, No Drawings

(56) References Cited

FOREIGN PATENT DOCUMENTS

| | | | |
|---|---|---|---|
| JP | 2013-211171 | A | 10/2013 |
| JP | 2014-216217 | A | 11/2014 |
| JP | 2015-232965 | A | 12/2015 |
| JP | 2017-117753 | A | 6/2017 |
| JP | 2017-199631 | A | 11/2017 |
| JP | 2018-45997 | A | 3/2018 |
| JP | 2018-49834 | A | 3/2018 |
| JP | 2018-81914 | A | 5/2018 |
| JP | 2018-97954 | A | 6/2018 |
| JP | 2019-71210 | A | 5/2019 |
| JP | 2019-160625 | A | 9/2019 |
| JP | 2019-169459 | A | 10/2019 |
| JP | 2020-27715 | A | 2/2020 |
| JP | 2020-119783 | A | 8/2020 |
| KR | 10-1952196 | B1 | 2/2019 |
| KR | 10-2020-0000849 | A | 1/2020 |
| WO | WO 2015/012042 | A1 | 1/2015 |
| WO | WO 2018/218057 | A2 | 11/2018 |
| WO | WO 2020/050269 | A1 | 3/2020 |
| WO | WO 2020/095937 | A1 | 5/2020 |

OTHER PUBLICATIONS

Extended European Search Report issued Aug. 5, 2024 in European Patent Application No. 21836933.8, 10 pages.

Chen, T. et al., "Argyrodite Solid Electrolyte with a Stable Interface and Superior Dendrite Suppression Capability Realized by ZnO Co-Doping," Applied Materials & Interfaces. vol. 11, 2019, pp. 40808-40816, XP055807493.

International Search Report issued Sep. 28, 2021 in PCT/JP2021/025673 filed Jul. 7, 2021, 3 pages.

International Search Report issued Sep. 28, 2021 in PCT/JP2021/025677 filed Jul. 7, 2021, 3 pages.

International Search Report issued Oct. 12, 2021 in PCT/JP2021/028382 filed Jul. 30, 2021, 2 pages.

Zhang et al., "Enhancing Ionic Conductivity of Solid Electrolyte by Lithium Substitution in Halogenated Li-Argyrodite", Journal of Power Sources, vol. 450, 227601, 2019, 7 pages.

Kraft et al., "Influence of Lattice Polarizability on the Ionic Conductivity in the Lithium Superionic Argyrodites $Li_6PS_5X$ (X=Cl, Br, I)," Journal of the American Chemical Society, Figure 1, 139, 2017, 10 pages.

Office Action mailed Nov. 26, 2025 in co-pending U.S. Appl. No. 18/159,733, 21 pages.

* cited by examiner

SULFIDE-BASED SOLID ELECTROLYTE USED IN LITHIUM ION SECONDARY BATTERY, METHOD FOR PRODUCING SAME, AND LITHIUM ION SECONDARY BATTERY

CROSS-REFERENCE TO RELATED APPLICATIONS

This is a bypass continuation of International Patent Application No. PCT/JP2021/025677, filed on Jul. 7, 2021, which claims priorities to Japanese Patent Application No. 2020-117194, filed on Jul. 7, 2020; Japanese Patent Application No. 2020-172693, filed on Oct. 13, 2020; and Japanese Patent Application No. 2021-086406, filed on May 21, 2021. The contents of these applications are hereby incorporated by reference in their entireties.

TECHNICAL FIELD

The present invention relates to a sulfide solid electrolyte to be used in a lithium-ion secondary battery, a method for manufacturing the same, and a lithium-ion secondary battery.

BACKGROUND ART

Lithium-ion secondary batteries are used broadly in portable electronic devices such as cellphones and laptops.

Although liquid electrolytes have been used conventionally in lithium-ion secondary batteries, there is concern about liquid leakage, bursting into flames, etc. and it is necessary to use a large case for safety designing. Furthermore, improvements are desired about a short battery life and a narrow operation temperature range.

In this situation, all-solid-state lithium-ion secondary batteries that employ a solid electrolyte as an electrolyte of a lithium ion secondary battery are attracting attention because they are expected to, for example, increase safety and enable high-speed charging/discharging and miniaturization of a case.

Solid electrolytes are generally classified into sulfide solid electrolytes and oxide solid electrolytes, and sulfide ions are higher in polarizability and exhibit higher ion conductivity than oxide ions. Examples of sulfide solid electrolytes include LGPS crystals such as $Li_{10}GeP_2S_{12}$, argyrodite crystals such as $Li_6PS_5Cl$, and LPS crystallized glass such as $Li_7P_3S_{11}$ crystallized glass.

Examples of a document that discloses an argyrodite sulfide solid electrolyte includes Patent literature 1. The sulfide solid electrolyte disclosed in Patent literature 1 has a cubic crystal structure belonging to a space group F-43m, includes a compound represented by a composition formula $Li_{7-x}PS_{6-x}Ha_x$ (Ha is Cl or Br, x=0.2 to 1.8), and is 60.0 or larger in the lightness L value of the L*a*b*color system. This is intended to increase the charging/discharging efficiency and improve the cycle characteristics by increasing the lithium ion conductivity and lowering the electron conductivity.

CITATION LIST

Patent Literature

Patent literature 1: WO 2015/012042

SUMMARY OF INVENTION

Technical Problem

However, if a sulfide solid electrolyte including an argyrodite crystal is sintered at a high temperature to lower interparticle resistivity called grain boundary resistivity, contrary to the intention the lithium ion conductivity decreases due to thermal decomposition. Specifically, $Li_6PS_5Cl$, for example, is decomposed into $Li_3PS_4+Li_2S+LiCl$. For this reason, the high-temperature heat treatment for lowering the grain boundary resistivity has limitations.

In view of the above, an object of the present invention is to provide an argyrodite sulfide solid electrolyte capable of existing stably without being decomposed even by high-temperature heat treatment as well as its manufacturing method.

Solution to Problem

The present inventors have studied diligently and completed the present invention by finding out that the above problem can be solved by having an oxide anion having a particular structure exist in an argyrodite crystal structure.

That is, the present invention relates to the following items [1] to [17]:

[1] A sulfide solid electrolyte to be used in a lithium-ion secondary battery, including:

a crystal phase; and an anion existing in a crystal structure of the crystal phase, in which the crystal phase includes an argyrodite crystal containing Li, P, S, and Ha;

Ha is at least one element selected from the group consisting of F, Cl, Br, and I;

the anion includes an oxide anion having a Q0 structure having an M-O bond that is a bond of M and O; and M is at least one element selected from the group consisting of metal elements and semimetal elements belonging to Groups 2 to 14 of a periodic table.

[2] The sulfide solid electrolyte according to item [1], in which contents (at %) of the respective elements satisfy a relationship $\{(M+O)/(Li+P+S+Ha+M+O)\}\leq 0.2$.

[3] The sulfide solid electrolyte according to item [1] or [2], in which when a ratio among contents (at %) of the respective elements contained in the argyrodite crystal is represented by $Li_a$—P—$S_b$-$Ha_c$, relationships 5<a<7, 4<b<6, and 0<c<2 are satisfied.

[4] The sulfide solid electrolyte according to any one of items [1] to [3], in which a sum of contents of the elements Li, P, S, Ha, M, and O is 90 mass % or higher.

[5] The sulfide solid electrolyte according to any one of items [1] to [4], in which M constituting the oxide anion includes at least one element selected from the group consisting of Si, Al, Zr, and B.

[6] The sulfide solid electrolyte according to any one of items [1] to [5], in which the following relational expressions are satisfied when a, P, and y are defined as α=(Li+

P+S+Ha), $\beta$=(Si+Al+Zr+B+O), and $\gamma$=Ha/P with contents (at %) of the respective elements:

$$0<\{\beta/(\alpha+\beta)\}<(D+0.1);\text{ and}$$

$$D=(0.1104\times\gamma-0.1133).$$

[7] The sulfide solid electrolyte according to any one of items [1] to [6], in which Ha includes Cl and Br, and when contents of Cl and Br in the argyrodite crystal are represented by x (at %) and y (at %), respectively, x/y is 0.1 or larger and 10 or smaller.

[8] The sulfide solid electrolyte according to any one of items [1] to [7], in which Ha includes Cl and Br, and when a ratio among contents (at %) of the respective elements contained in the argyrodite crystal is represented by $Li_a$—P—$S_b$—$Cl_{c1}$—$Br_{c2}$, c1 is 0.1 or larger and 1.5 or smaller and c2 is 0.1 or larger and 1.9 or smaller.

[9] The sulfide solid electrolyte according to any one of items [1] to [8], in which the argyrodite crystal contains at least one element, referred to as R, selected from the group consisting of Na, K, Mg, and Ca, and when a ratio among contents (at %) of the respective elements contained in the argyrodite crystal is represented by $Li_{a1}$-$R_{a2}$—P—$S_b$-$Ha_c$, a2 is in a range of 0.001 to 0.4.

[10] The sulfide solid electrolyte according to any one of items [1] to [9], in which a capacity retention rate that is given by the following equation is 80% or higher when an all-solid-state lithium-ion secondary battery is manufactured and subjected to a charging/discharging test by the following method:

(Method):

(Production of Positive Electrode Composite Member):

a positive electrode composite member is produced by using, as a positive electrode active material, a bedded rock salt $LiCoO_2$ powder (volume-average particle diameter: 10 μm) with a 7 nm-thick $LiNbO_3$ coat and mixing the sulfide solid electrolyte (35 parts by mass), the positive electrode active material (60 parts by mass), and a conductive agent (acetylene black "HS100" produced by Denka Company Limited, 5 parts by mass); a thickness of the $LiNbO_3$ coat is determined by an observation using a transmission electron microscope (TEM);

(Production of all-Solid-State Lithium-Ion Secondary Battery):

a solid electrolyte layer is formed by putting the sulfide solid electrolyte (80 mg) into a plastic cylinder having a diameter of 10 mm and subjecting the sulfide solid electrolyte to pressure molding; then a positive electrode layer is formed by putting the positive electrode composite member (10 mg) into the cylinder and performing pressure molding again; a negative electrode layer is formed by putting an indium foil and a lithium foil from a side opposite to the positive electrode composite member; an all-solid-state lithium-ion secondary battery is produced in this manner and subjected to a charging/discharging test with a confining pressure of 10 kN;

(Charging/Discharging Test):

a 100-cycle constant current charging/discharging test is performed at 25° C. with a charging/discharging current density of 0.1 C and a charging/discharging potential range of 1.9 to 3.7 V using the all-solid-state lithium-ion secondary battery; a capacity retention rate (%) that is given by the following equation is determined from results of the charging/discharging test:

(capacity retention rate (%))={(discharge capacity at 100th cycle)/(discharge capacity at first cycle)}×100.

[11] The sulfide solid electrolyte according to any one of items [1] to [10], in which an oxide layer is formed at an interface between the solid electrolyte layer and a positive electrode layer when a lithium-ion secondary battery including a solid electrolyte layer including the sulfide solid electrolyte is charged and discharged.

[12] A lithium-ion secondary battery including the sulfide solid electrolyte according to any one of items [1] to [11].

[13] A manufacturing method of a sulfide solid electrolyte to be used in a lithium-ion secondary battery, including:

obtaining an argyrodite crystal by mixing together raw materials containing Li, P, S, and Ha and by causing crystallization by heating a resulting mixture;

obtaining a mixture by mixing an oxide having an M-O bond that is a bond of M and O with the argyrodite crystal; and obtaining an argyrodite crystal in which an oxide anion having a Q0 structure having an M-O bond exists in a crystal structure by performing heat treatment on the mixture, in which Ha is at least one element selected from the group consisting of F, Cl, Br, and I;

M is at least one element selected from the group consisting of metal elements and semimetal elements belonging to Groups 2 to 14 of a periodic table; and the sulfide solid electrolyte includes the argyrodite crystal in which the oxide anion having a Q0 structure having an M-O bond exists in the crystal structure.

[14] A manufacturing method of a sulfide solid electrolyte to be used in a lithium-ion secondary battery, including:

obtaining a raw material composition by mixing together raw materials containing Li, P, S, and Ha and an oxide having an M-O bond that is a bond of M and O; and obtaining an argyrodite crystal in which an oxide anion having a Q0 structure having an M-O bond exists in a crystal structure by performing heat treatment on the raw material composition, in which Ha is at least one element selected from the group consisting of F, Cl, Br, and I;

M is at least one element selected from the group consisting of metal elements and semimetal elements belonging to Groups 2 to 14 of a periodic table; and the sulfide solid electrolyte includes the argyrodite crystal in which the oxide anion having a Q0 structure having an M-O bond exists in the crystal structure.

[15] A manufacturing method of a sulfide solid electrolyte to be used in a lithium-ion secondary battery, including:

obtaining an intermediate product by causing raw materials containing Li, P, S, and Ha to react with each other.

obtaining a mixture by mixing the intermediate product with an oxide having an M-O bond that is a bond of M and O; and obtaining an argyrodite crystal in which an oxide anion having a Q0 structure having an M-O bond exists in a crystal structure by performing heat treatment on the mixture, in which Ha is at least one element selected from the group consisting of F, Cl, Br, and I;

M is at least one element selected from the group consisting of metal elements and semimetal elements belonging to Groups 2 to 14 of a periodic table; and the sulfide solid electrolyte includes the argyrodite crystal in which the oxide anion having a Q0 structure having an M-O bond exists in the crystal structure.

[16] A manufacturing method of a sulfide solid electrolyte to be used in a lithium-ion secondary battery, including:

obtaining an argyrodite crystal by mixing together raw materials containing Li, P, S, and Ha and causing crystallization by heating a resulting mixture;

obtaining a composition including an oxide anion having a Q0 structure having an M-O bond that is a bond of M and 0;

obtaining a mixture by mixing the argyrodite crystal with the composition; and obtaining an argyrodite crystal in which an oxide anion having a Q0 structure having an M-O bond exists in a crystal structure by performing heat treatment on the mixture, in which:

Ha is at least one element selected from the group consisting of F, Cl, Br, and I;

M is at least one element selected from the group consisting of metal elements and semimetal elements belonging to Groups 2 to 14 of a periodic table; and the sulfide solid electrolyte includes the argyrodite crystal in which the oxide anion having a Q0 structure having an M-O bond exists in the crystal structure.

[17] The manufacturing method of a sulfide solid electrolyte according to any one of items [13] to [16], in which the heat treatment is performed at a temperature of 500° C. or higher.

Advantageous Effects of Invention

Capable of existing stably without being decomposed even by high-temperature heat treatment, the sulfide solid electrolyte according to the present invention can lower the grain boundary resistivity by sintering. As a result, increase in lithium ion conductivity is expected. As such, the sulfide solid electrolyte according to the present invention is very useful as a solid electrolyte for a lithium-ion secondary battery. The battery characteristics of the lithium-ion secondary battery can thus be improved.

DESCRIPTION OF EMBODIMENT

Although the present invention will be hereinafter described in detail, the present invention is not limited to the following embodiment and can be practiced being modified in a desired manner within such a range as not to depart from the spirit and scope of the present invention. Furthermore, the symbol "-" or the word "to" indicating a numerical value range is used in such a sense as to include numerical values written before and after the symbol or the word as a lower limit value and an upper limit value of the range, respectively.

Sulfide Solid Electrolyte

A sulfide solid electrolyte according to the embodiment (hereinafter may be referred to simply as "solid electrolyte") is used in a lithium-ion secondary battery and includes a crystal phase and an anion that exists in a crystal structure of the crystal phase.

The crystal phase includes an argyrodite crystal containing Li, P, S, and Ha, where Ha is at least one element selected from the group consisting of F, Cl, Br, and I.

The anion includes an oxide anion having a Q0 structure having an M-O bond that is a bond of M and O (hereinafter may be referred to simply as "oxide anion" or "oxide anion having a Q0 structure"). M is at least one element selected from the group consisting of the metal elements and the semimetal elements in Groups 2 to 14 of the periodic table.

Oxide Anion

The presence of an oxide anion having a Q0 structure in a crystal structure of the crystal phase of the solid electrolyte increases the heat resistance of the argyrodite crystal and allows the solid electrolyte to continue to exist stably without being decomposed even by high-temperature heat treatment. This enables heat treatment for decreasing the grain boundary resistivity while maintaining necessary lithium ion conductivity of the electrolyte.

The Q0 structure is a structure that all oxygen atoms connected to the central cation M are a non-bridging oxygen. For example, in the case where M is Si, this means that an oxide $SiO_2$ exists in the form of a silicate ion, that is, an oxide anion $SiO_4^{4-}$.

Stated differently, "the presence of an oxide anion having a Q0 structure in a crystal structure" is a state that it is fixed in a crystal structure. More specifically, this means a case that an argyrodite crystal phase is formed with an oxide anion having a Q0 structure serving as a crystal nucleus, a case that an oxide anion having a Q0 structure is captured in an argyrodite crystal structure, or both. The fixing of an oxide anion having a Q0 structure is a phenomenon that is unique to the case of an argyrodite crystal containing at least three elements of Li, S, and Ha.

On the other hand, an oxide anion having a Q0 structure is not fixed properly in a crystal structure in the cases of Li—P—S three-component crystals that contain three elements of Li, P, and S but do not contain Ha such as $Li_7P_3Sn_{11}$ and LGPS crystals such as $LiioGeP_2S_{12}$.

The reason why the presence of an oxide anion having a Q0 structure allows the argyrodite crystal to exist stably instead of being decomposed even at a high temperature is uncertain. However, the formation of the argyrodite crystal phase with an oxide anion having a Q0 structure serving as a crystal nucleus would provide an effect of stabilizing the crystallization and an effect that an oxide anion having a Q0 structure is captured in the argyrodite crystal structure to be stabilized. In the case where there exist both of an oxide anion having a Q0 structure that serves as a crystal nucleus and an oxide anion having a Q0 structure that is captured in a crystal structure, it is inferred that the argyrodite crystal can exist more stably because of a composite factor consisting of the above effects.

For example, in the case of the argyrodite crystal being $Li_6PS_5Cl$, the anion constituting $Li_6PS_5Cl$ is $PS_4^{3}$—. When an oxide anion having a Q0 structure such as $SiO_4^{4}$— comes to be located at this anion site, the heat resistance of the crystal would be increased as a result of strengthened electrostatic attractive force. Furthermore, a lithium ion-conductive argyrodite crystal is of a high-temperature stable phase in many cases and incorporation of an oxide anion having a Q0 structure such as $SiO_4^{4}$— would provide a thermodynamical stabilizing effect.

Still further, it is also inferred that a dense crystal having a small crystallite size can be formed in the case where the argyrodite crystal is formed or re-formed with an oxide anion having a Q0 structure serving as a crystal nucleus.

It suffices that the elements that constitute the oxide anion include M and O where M is at least one element selected from the group consisting of the metal elements and the semimetal elements belonging to Groups 2 to 14 of the periodic table. The oxide anion may be either of only one kind or plural kinds.

The metal elements belonging to Groups 2 to 14 are the elements belonging to Groups 2 to 12, the elements belonging to Group 13 other than B, and the elements belonging to Group 14 other than C, Si, and Ge, of the periodic table.

The semimetal elements belonging to Groups 2 to 14 are B, Si, and Ge among the elements belonging to Groups 13 and 14 of the periodic table.

Although the above-mentioned effects of an oxide anion having a Q0 structure can be obtained even if an element M having a weak M-0 bond is selected, there is a probability that, for example, oxygen is lost or evaporated during a heating step, or oxygen atoms are captured at unexpected anion sites in the crystal. Thus, it is preferable that an element M whose M-O bonding force is 400 kJ/mol or stronger be contained, even preferably 450 kJ/mol 30 or stronger and further preferably 500 kJ/mol or stronger.

Although the M-O bonding force has no particular upper limit, in general it should be 1,000 k/mol or weaker.

From the above reason, it is preferable that M include at least one element selected from the group consisting of the metal elements and the semimetal elements belonging to Groups 2 to 14 of the periodic table, even preferably at least one element selected from the group consisting of Al, B, Ge, La, Ta, Nb, Ti, Si, Sn, V, Y, and Zr.

It is noted that in this specification the term "M-O bonding force" means bond dissociation energy, and each kind of bond has a specific bond dissociation energy value. Its calculation method is defined as a standard enthalpy change $\Delta Hf298=\Delta Hf298(M)+\Delta Hf298(O)-\Delta Hf298(MO)$ in an $MO \rightarrow M+O$ dissociation reaction.

It is preferable that the oxide anion have a wide potential window. This is because it is preferable that the oxide anion be not prone to be oxidized or reduced during charging or discharging of a lithium ion secondary battery taking into consideration that it is used in a solid electrolyte of a lithium ion secondary battery.

From the above reason, as for the reduction potential of M and an $M^{n+}$ ion existing stably in M, it is even preferable that the oxide anion include at least one element selected from the element group in which the $M^{n+}/M$ reduction potential is −0.5 V (vs. SHE) or lower. Furthermore, from the viewpoint of the oxidation/reduction resistance of an oxide of M, it is further preferable that the oxide anion include at least one element selected from the group consisting of Si, Al, Zr, and B.

Whether an M-O bond exists can be checked by a Raman spectroscopic measurement or a nuclear magnetic resonance (NMR) measurement.

In the Raman spectroscopic measurement, presence of the M-O bond can be confirmed in the form of a Raman scattering spectrum in a range of 750 to 1,500 $cm^{-1}$. For example, an Si—O bond, an Al—O bond, a Zr—O bond, and a B—O bond have a peak in a range of 800 to 1,300 $cm^{-1}$, a range of 775 to 1,275 $cm^{-1}$, a range of 850 to 1,350 $cm^{-1}$, and a range of 925 to 1,425 $cm^{-1}$, respectively.

The NMR measurement is applicable to limited nuclides; for example, in $^{29}Si$—NMR, a peak of an Si—O bond is found in a range of −125 to −50 ppm (reference substance: tetramethyl silane). In $^{27}Al$-NMR, a peak of an Al—O bond is found in a range of 0 to 80 ppm (reference substance: aluminum chloride). In $^{11}B$-NMR, a peak of a B—O bond is found in a range of −10 to 20 ppm (reference substance: boron trifluoride-diethyl ether complex). Although $^{91}Zr$-NMR is applicable to a nuclide Zr, at present, it is not a very common analysis technique at the current moment.

The fact that an oxide anion has a Q0 structure can be confirmed by the Raman spectroscopic measurement or the nuclear magnetic resonance (NMR) measurement.

In the Raman spectroscopic measurement, for example, an Si—O bond of the Q0 structure, an Al—O bond of the Q0 structure, a Zr—O bond of the Q0 structure, and a B—O bond of the Q0 structure have a peak in a range of 800 to 900 $cm^{-1}$, a range of 775 to 875 $cm^{-1}$, a range of 850 to 950 $cm^{-1}$, and a range of 925 to 1,025 $cm^{-1}$, respectively.

As for the NMR measurements, in, for example, $^{29}Si$—NMR, a peak of an Si—O bond of the Q0 structure is found in a range of −70 to −60 ppm (reference substance: tetramethyl silane). In $^{27}Al$—NMR, a peak of an Al—O bond of the Q0 structure is found in a range of 50 to 80 ppm (reference substance: aluminum chloride). In $^{11}B$-NMR, a peak of a B—O bond of the Q0 structure is found in a range of −5 to 15 ppm (reference substance: boron trifluoride-diethyl ether complex).

Presence of an oxide anion having a Q0 structure in a crystal structure, that is, its presence in an anion site of a crystal, can be confirmed by an X-ray powder diffraction (XRD) measurement or a neutron beam scattering measurement.

All oxide anions in a solid electrolyte need not have the Q0 structure and need not exist in argyrodite crystal structures. The advantages of the present invention can be obtained even if the proportion of an oxide anion having a Q0 structure with respect to all oxide anions is small.

Argyrodite Crystal

The argyrodite crystal contains Li, P, S, and Ha; where Ha is at least one kind of halogen element selected from the group consisting of F, Cl, Br, and I. Argyrodite crystals may be of either only one kind having the same composition or two or more kinds having different compositions.

A crystal structure can be analyzed from an X-ray powder diffraction (XRD) pattern. It can be said that a crystal structure is of an argyrodite type if an XRD pattern has a peak at $2\theta=15.7\pm0.5°$ and $30.2\pm0.5°$. It is preferable that the XRD pattern have a peak at $2\theta=18.0\pm0.5°$ in addition to the above angles and it is even preferable that the XRD pattern have an additional peak at $2\theta=25.7\pm0.5°$.

When the argyrodite crystal is represented by $Li_a$—P—$S_b$-$Ha_c$, it is preferable that the ratio among the contents (at %) of the elements constituting the argyrodite crystal (i.e., the ratio among the contents (at %) of the elements included in the argyrodite crystal) satisfy relationships $5<a<7$, $4<b<6$ and $0<c<2$ because in that case the crystal easily assumes the argyrodite type. It is even preferable that the ratio satisfy relationships $5.1<a<6.3$, $4<b<5.3$ and $0.7<c<1.9$, further preferably $5.2<a<6.2$, $4.1<b<5.2$ and $0.8<c<1.8$. That is, it is preferable that a parameter of a satisfy a relationship $5<a<7$, even preferably $5.1<a<6.3$ and further preferably $5.2<a<6.2$. It is preferable that a parameter of b satisfy a relationship $4<b<6$, even preferably $4<b<5.3$ and further preferably $4.1<b<5.2$. It is preferable that a parameter of c satisfy a relationship $0<c<2$, even preferably $0.7<c<1.9$ and further preferably $0.8<c<1.8$. In this specification, the term "element ratio" means a ratio among the contents (at %) of elements.

Whereas a preferable crystal structure is cubic (e.g., F-43m), crystal structures that are lower in symmetry such as hexagonal, tetragonal, orthorhombic crystal or monoclinic ones, or a crystal structure that is even lower in symmetry such as a triclinic one may exist.

The halogen element represented by Ha is at least one kind selected from the group consisting of F, Cl, Br, and I. Since the crystal becomes of an argyrodite type, it is preferable that the crystal contain at least one of Cl and Br, even preferably Cl. It is further preferable that Ha be Cl only or a mixture of Cl and Br.

In the case where Ha includes Cl and Br, when the contents of Cl and Br in the argyrodite crystal are represented by x (at %) and y (at %), respectively, it is preferable that x/y be 0.1 or larger, even preferably 0.3 or larger and further preferably 0.5 or larger. On the other hand, it is preferable that x/y be 10 or smaller, even preferably 3 or smaller and further preferably 1.6 or smaller. In the case where x/y is in the above range, the interaction between lithium ions and halide ions becomes weaker, producing a tendency that the lithium ion conductivity of a solid electrolyte as subjected to heat treatment becomes high. This is considered due to an influence of a mixed anion effect that the interaction between cations and anions is weakened by the mixing of bromide ions that are larger in ion diameter than chloride ions. Furthermore, in the case where x/y is in the above range, the cycle characteristics of a lithium ion secondary battery are improved easily.

In the case where Ha includes Cl and Br, when the ratio among the contents (at %) of the respective elements constituting the argyrodite crystal is represented by $Li_a$—P—$S_b$—$Cl_{c1}$—$Br_{c2}$, it is preferable that c1 be 0.1 or larger, even preferably 0.3 or larger and further preferably 0.5 or larger. It is preferable that c1 be 1.5 or smaller, even preferably 1.4 or smaller and further preferably 1.3 or smaller. It is preferable that c2 be 0.1 or larger, even preferably 0.3 or larger and further preferably 0.5 or larger. It is preferable that c2 be 1.9 or smaller, even preferably 1.6 or smaller and further preferably 1.4 or smaller. In the case where c1 and c2 are in the above respective ranges, a stable argyrodite crystal can be obtained while the proportions of halide ions in the crystal are made optimum and the interaction between anions and lithium ions in the crystal is made weak. As a result, the lithium ion conductivity of a solid electrolyte as subjected to heat treatment is easily made high. Furthermore, in the case where c1 and c2 are in the above ranges, the cycle characteristics of a lithium ion secondary battery are improved easily.

In addition, it is preferable that parameters of a, b, and (c1+c2) satisfy relationships that are similar to the above-mentioned relationships for a, b, and c.

From the viewpoint of obtaining high lithium ion conductivity when a battery is formed by grinding or pulverizing a solid electrolyte, it is preferable that the crystallite size of the argyrodite crystal be small. More specifically, it is preferable that the crystallite size be 1,000 nm or smaller, even preferably 500 nm or smaller and further preferably 250 nm or smaller. Although there are no particular limitations on the lower limit of the crystallite size, the crystallite size is usually 5 nm or larger.

The crystallite size can be calculated using a peak half width of an XRD pattern and the Scherrer equation.

A mixture containing lithium sulfide ($Li_2S$) is used preferably as a raw material of the argyrodite crystal which will be described later in detail. In this connection, it is known widely that lithium sulfide is manufactured from lithium hydroxide (LiOH), and lithium hydroxide can contain at least one element (hereinafter also referred to as "R") selected from the group consisting of Na, K, Mg, and Ca as impurities. If the argyrodite crystal is manufactured using raw materials containing R, there may occur a case that the resulting argyrodite crystal also contain R. In this connection, to lower the content of R in the argyrodite crystal, it is necessary to use highly pure raw materials, which may increase the manufacturing cost.

The present inventors studied how R contained in the argyrodite crystal influences physical properties of a solid electrolyte and found out that there are no influences on the lithium ion conductivity and the heat resistance of a solid electrolyte as long as the content of R is in a prescribed range.

That is, the argyrodite crystal may contain at least one element (referred to as "R") selected from the group consisting of Na, K, Mg, and Ca. Furthermore, with the ratio among the contents (at %) of the elements constituting the argyrodite crystal when containing R represented by $Li_{a1}$-$R_{a2}$—P—$S_b$-$Ha_c$, from the viewpoint of suppression of the manufacturing cost, it is preferable that a2 be 0.001 or larger, even preferably 0.01 or larger and further preferably 0.02 or larger. From the viewpoint of suppressing reduction of the lithium ion conductivity, it is preferable that a2 be 0.4 or smaller, even preferably 0.3 or smaller and further preferably 0.2 or smaller. The argyrodite crystal need not contain R.

In addition, it is preferable that parameters of a1, b, and c satisfy relationships that are similar to the above-mentioned relationships for a, b, and c. However, the a1 value may be smaller than the above-mentioned preferable numerical value range of a according to the a2 value. In this case, it is preferable that the value of (a1+a2) satisfy $5<(a1+a2)<7$.

Mg and Ca among Na, K, Mg, and Ca can also be contained in a solid electrolyte as M that is a constituent of the above-described oxide anion. In the case where a solid electrolyte contains at least one of the elements Mg and Ca, whether these elements are contained as M or R can be judged by analyzing a crystal structure by performing a Rietveld analysis on an XRD pattern. In the case where the above elements are contained as R, an analysis result should be such that Mg and Ca exist in a crystal structure and $O^{2-}$ does not exist in their vicinities. The expression "$O^{2-}$ does not exist in their vicinities" means $O^{2-}$ does not exist so as to be closer than second closest elements of Mg and Ca do.

Solid Electrolyte

From the viewpoint of achieving high ion conductivity, it is preferable that the sum of the contents of elements constituting the crystal phase including the argyrodite crystal and the oxide anion with respect to all the components of a solid electrolyte be 90 mass % or larger, even preferably 92 mass % or larger and further preferably 94 mass % or larger. There are no particular limitations on the upper limit of the sum of the contents; it may be 100 mass %. The crystal phase can include an amorphous phase in addition to the argyrodite crystal. The crystal phase may include another argyrodite crystal phase made up of at least one of Li, P, S, and Ha.

For example, the sum of the contents is the sum of the contents of elements of Li, P, S, Ha, M, and plus the content of R if the argyrodite crystal includes R. In this specification, the term "content of Ha" means the sum of the contents of F, Cl, Br, and I.

The contents of the individual elements and their sum can be determined by a composition analysis using ICP atomic emission spectrometry, atomic absorption spectrometry, ion chromatography, etc.

From the viewpoint of achieving high lithium ion conductivity, it is preferable that the proportion of the argyrodite crystal in the solid electrolyte be 50 mass % or larger, even preferably 65 mass % or larger and further preferably 80 mass % or larger. There are no particular limitations on its upper limit; although it may be 100 mass %, it is commonly 99 mass % or smaller. The proportion of the argyrodite crystal can be calculated by performing a measurement by XRD or neutron beam scattering by having it contain an internal reference substance and by comparing peak intensity of it with that of the internal reference substance.

What may be included in the solid electrolyte other than the crystal phase including the argyrodite crystal and the oxide anion include, for example, $Li_3PS_4$, $Li_4P_2S_6$, $Li_2S$, and LiHa (Ha is at least one kind of halogen element selected from F, Cl, Br, and I).

The ratio, i.e., element ratio, of the sum (at %) of elements constituting the oxide anion with respect to the sum (at %) of elements constituting the argyrodite crystal and the oxide anion can be represented by, for example, {(M+O)/(Li+P+S+Ha+M+O)}.

From the viewpoints that the ion conductivity decreases and the electrolyte becomes prone to be affected by oxidation during its formation if the oxide anion is included at a large proportion, it is preferable that the ratio represented by {(M+O)/(Li+P+S+Ha+M+O)} be 0.2 or smaller, even preferably 0.18 or smaller and further preferably 0.15 or smaller. The oxide anion provides an effect of stabilizing high-temperature heat treatment even if its proportion is small. From the viewpoint of obtaining this effect satisfactorily, it is preferable that the above ratio be 0.0005 or larger. From the viewpoint of obtaining higher conductivity, it is preferable that the above ratio be 0.05 or larger, even preferably 0.01 or larger.

In the case where the argyrodite crystal contains R, the above-mentioned element ratio is represented by {(M+O)/(Li+P+S+Ha+R+M+O)}.

The proportion of the sum (at %) of elements constituting the oxide anion with respect to the sum (at %) of elements constituting the argyrodite crystal and the oxide anion depends on the composition, in particular, the content of Ha.

In the case where the ratio of the contents (at %) of elements constituting the argyrodite crystal is represented by $Li_{7-\gamma}PS_{6-\gamma}Ha_{\gamma}$, the ratio of the content of Ha to that of P is γ=Ha/P. In the case where the γ value is small, a large number of S (sulfur) atoms having a weak bonding force exist at isolated anion sites of the argyrodite crystal structure, as a result of which the solid electrolyte becomes prone to be decomposed by oxidation. Thus, it is difficult to incorporate the oxide anion at a large proportion. On the other hand, in the case where the γ value is large, crystals of lithium halide such as LiCl become prone to precipitate. It is therefore preferable to attain stabilization by incorporating the oxide anion at a larger proportion.

In manufacturing a sulfide solid electrolyte, an oxide to become the oxide anion may be in the form of a nanosize fine powder, a micronsize powder, or coarse grains. It may be mixed intentionally from a container that is used during manufacture. This oxide need not have the Q0 structure at a time when it is added in manufacturing the sulfide solid electrolyte.

As for indices indicating the above relationships, it is preferable that the following relational expressions be satisfied when a, (3, and y are defined as α=(Li+P+S+Ha), β=(Si+Al+Zr+B+O), and γ=(Ha/P) with contents (at %) of the respective elements. It is noted that a is defined as α=(Li+P+S+Ha+R) in the case of the argyrodite crystal containing R.

$$0<\{\beta/(\alpha+\beta)\}<(D+0.1);\text{ and}$$

$$D=(0.1104\times\gamma-0.1133).$$

The value represented by {β/(x+β))} has the same value as the above-mentioned value represented by {(M+O)/(Li+P+S+Ha+M+O)}. The above relational expressions mean that if the amount of Ha contained in the solid electrolyte is large, the optimum amount of the oxide anion also increases to attain the advantages of the present invention more satisfactorily. The function representing D indicates an optimum value of {β/(α+β)} for each element ratio of Ha to P and is a function derived from results of Inventive Examples and Comparative Examples to be described later.

It is even preferable that the value represented by {β/(α+β)} satisfy the following relational expressions:

$$0<\{\beta/(\alpha+\beta)\}<E;\text{ and}$$

$$E=(0.2018\times\gamma-0.1608).$$

It is preferable that the thermal decomposition resistance test temperature of the solid electrolyte as an index of heat resistance be 500° C. or higher, even preferably 600° C. or higher and further preferably 650° C. or higher. Although there are no particular limitations on its upper limit, it is usually 900° C. or lower.

In a thermal decomposition resistance test for the solid electrolyte, the solid electrolyte is put in a container that does not react with the solid electrolyte, and heat treatment is performed at a prescribed temperature for 10 to 60 minutes. Heat resistance can be evaluated by checking a change between ion conductivity values before and after the heat treatment. The solid electrolyte whose ion conductivity does not vary when it has gone through the heat treatment is preferable. It can be said that the solid electrolyte whose ion conductivity after the heat treatment is smaller than half of its ion conductivity before the heat treatment is low in thermal decomposition resistance, that is, heat resistance.

As for an index of the above-described heat resistance, lithium ion conductivity that is obtained after experiencing high-temperature heat treatment will be described below in detail.

For example, assume that an argyrodite crystal having a particular composition has lithium ion conductivity σ1. If lithium ion conductivity σ2 obtained after it has been subjected to heat treatment at a particular temperature is lower than σ1 (σ1>σ2), this means that at least part of this crystal has decomposed thermally. In contrast, if lithium ion conductivity σ3 that is obtained when the solid electrolyte according to the embodiment including an argyrodite crystal having the same composition has been subjected to heat treatment of the same conditions is higher than σ2 (σ3>σ2), it can be judged that the thermal decomposition is suppressed and it can be said that the solid electrolyte according to the embodiment is high in heat resistance. Furthermore, if σ3 thus obtained is higher than σ1 (σ3>σ1), it can be judged that an argyrodite crystal having even higher lithium ion conductivity has been reconstructed by the heat treatment. Furthermore, it is considered that when an argyrodite crystal having such a composition is used both advantages of increase in bulk lithium ion conductivity and reduction in grain boundary resistivity can be obtained in a sintering step.

In this specification, the term "lithium ion conductivity" means lithium ion conductivity at 25° C. and is determined from a Nyquist plot obtained by an AC impedance measurement.

The solid electrolyte according to the embodiment satisfies the above-mentioned relationship σ3>σ2. It is preferable that the solid electrolyte according to the embodiment satisfy a relationship σ3≥1.5×σ2, even preferably σ3≥3×σ2. The degree of preference increases as σ3 becomes higher.

It is also preferable that the solid electrolyte according to the embodiment satisfy the above-mentioned relationship σ3>σ1.

The solid electrolyte according to the embodiment exhibits high heat resistance and it is preferable to control the cooling rate that is employed after heat treatment. From the viewpoint of decreasing the crystallite size, it is preferable to perform cooling at a cooling rate of 1° C./s or higher. From the viewpoint of causing crystal growth during cooling, it is preferable to perform cooling at a cooling rate of 1° C./s or lower. It is preferable to change the cooling rate in this manner, that is, according to a desired physical property.

When the solid electrolyte is used in a lithium-ion secondary battery, if necessary, a solid electrolyte layer is formed together with other components such as a binder. The binder and the other components are known ones.

It is preferable that the content of the solid electrolyte with respect to the entire solid electrolyte layer be 80 mass % or higher, even preferably 90 mass % or higher.

A method of forming the solid electrolyte layer is also a known one. For example, the solid electrolyte layer can be formed by producing slurry by dispersing or dissolving components to constitute the solid electrolyte layer in a solvent, applying the slurry in a layer form (sheet form), drying it, and optionally pressing a dried layer. If necessary, debinding treatment may be performed by applying heat. The thickness of the solid electrolyte layer can be adjusted easily by adjusting, for example, the application amount of the slurry.

Instead of the wet shaping, the solid electrolyte layer may be formed by pressing solid electrolyte powder or the like on the surface of a positive electrode, a negative electrode, or the like in a dry state. Another forming method is possible in which the solid electrolyte layer is formed on another substrate and then transferred onto the surface of a positive electrode, a negative electrode, or the like.

The solid electrolyte may be used as a positive electrode layer or a negative electrode layer by mixing it with a positive electrode active material or a negative electrode active material. The positive electrode active material used in a positive electrode layer or the negative electrode active material used in a negative electrode layer, a current collector, a binder, a conductive agent, etc. are known ones.

A lithium-ion secondary battery in which the solid electrolyte is employed includes the solid electrolyte layer, the positive electrode layer, and the negative electrode layer.

A material of an exterior body of the lithium-ion secondary battery can also be a known one. A shape of the lithium-ion secondary battery can also be a known one such as a coin shape, a sheet shape (film shape), a folded shape, a winding cylindrical shape having a bottom, and a button shape, one of which is selected as appropriate according to a use.

A lithium-ion secondary battery including the sulfide solid electrolyte according to the embodiment is superior in cycle characteristics. For example, when an all-solid-state lithium-ion secondary battery is produced and subjected to a charging/discharging test by the following method, it is preferable that the capacity retention rate that is given by the following equation be 80% or higher, even preferably 85% or higher and further preferably 90% or higher. The degree of preference increases as the capacity retention rate becomes higher and it may be 100%.

Method

Production of Positive Electrode Composite Member

A positive electrode composite member is produced by using, as a positive electrode active material, a bedded rock salt $LiCoO_2$ powder (volume-average particle diameter: 10 μm) with a 7 nm-thick $LiNbO_3$ coat and mixing the sulfide solid electrolyte according to the embodiment (35 parts by mass), the positive electrode active material (60 parts by mass), and a conductive agent (acetylene black “HS100” produced by Denka Company Limited, 5 parts by mass). The thickness of the $LiNbO_3$ coat is determined by an observation using a transmission electron microscope (TEM).

Production of all-Solid-State Lithium-Ion Secondary Battery

A solid electrolyte layer is formed by putting the sulfide solid electrolyte according to the embodiment (80 mg) into a plastic cylinder having a diameter of 10 mm and subjecting the sulfide solid electrolyte to pressure molding. Then a positive electrode layer is formed by putting the positive electrode composite member (10 mg) into the cylinder and performing pressure molding again. A negative electrode layer is formed by putting an indium foil and a lithium foil from a side opposite to the positive electrode composite member. An all-solid-state lithium-ion secondary battery is produced in this manner and subjected to a charging/discharging test with a confining pressure of 10 kN.

It is noted that a preferable sulfide solid electrolyte to be used as the positive electrode composite member and the solid electrolyte layer is a powder-like one obtained by, for example, grinding or pulverization.

Charging/Discharging Test

A 100-cycle constant current charging/discharging test is performed at 25° C. with a charging/discharging current density of 0.1 C and a charging/discharging potential range of 1.9 to 3.7 V using the all-solid-state lithium-ion secondary battery. A capacity retention rate (%) that is given by the following equation is determined from results of the charging/discharging test:

(capacity retention rate (%))={(discharge capacity at 100th cycle)/(discharge capacity at first cycle)}×100.

As the capacity retention rate increases, the reduction of battery properties caused by repeated charging and discharging is suppressed more and the cycle characteristics can be judged even superior. The reason why a lithium-ion secondary battery including the sulfide solid electrolyte according to the embodiment is superior in cycle characteristics is considered because a thin oxide layer originating from oxygen in the solid electrolyte is formed at the interface between the solid electrolyte layer and the positive electrode layer in, for example, the charging/discharging test performed under the above conditions. It is considered that the cycle characteristics are improved because sulfide ions in the solid electrolyte thereby become less prone to decompose. It is noted that even in the case where the sulfide solid electrolyte according to the embodiment is used as, for example, a solid electrolyte layer of a lithium-ion secondary battery that is different in configuration from the all-solid-state lithium-ion secondary battery subjected to the above charging/discharging test, a similar oxide layer can be formed by charging and discharging of such a battery.

In particular, it is preferable that Ha in the argyrodite crystal include Cl and Br and the ratio between these elements be in the above-mentioned preferable range because in that case the cycle characteristics can be improved more easily.

Manufacturing Method of Sulfide Solid Electrolyte

There are no particular limitations on the manufacturing method of a sulfide solid electrolyte to be used in a lithium-ion secondary battery according to the embodiment except that the argyrodite crystal is obtained that contains Li, P, S, and Ha and in which an oxide anion having a Q0 structure having an M-O bond (i.e., a bond of M and O) exists in a crystal structure.

More specifically, for example, the argyrodite crystal in which an oxide anion having a Q0 structure having an M-O bond exists in a crystal structure is obtained by performing heat treatment on a mixture of at least one of plural compounds to serve as materials of the argyrodite crystal and the argyrodite crystal and at least one of an oxide having an M-O bond and a composition including an oxide anion having a Q0 structure having an M-O bond.

Since there are no particular limitations on the timing of the heat treatment, the sulfide solid electrolyte according to the embodiment can be obtained using, for example, any of the following manufacturing methods (i) to (iv):

Manufacturing Method (i)

A manufacturing method (i) includes the following steps:

(Step i-1) A step of obtaining an argyrodite crystal by mixing together raw materials containing Li, P, S, and Ha and by causing crystallization by heating a resulting mixture.

(Step i-2) A step of obtaining a mixture by mixing an oxide having an M-O bond (i.e., a bond of M and O) with the thus-obtained argyrodite crystal.

(Step i-3) A step of obtaining an argyrodite crystal in which an oxide anion having a Q0 structure having an M-O bond exists in a crystal structure by performing heat treatment on the thus-obtained mixture.

Ha is at least one element selected from the group consisting of F, Cl, Br, and I. M is at least one element selected from the group consisting of the metal elements and the semimetal elements belonging to Groups 2 to 14 of the periodic table.

Manufacturing Method (ii)

A manufacturing method (ii) includes the following steps:

(Step ii-1) A step of obtaining a raw material composition by mixing together raw materials containing Li, P, S, and Ha and an oxide having an M-O bond (i.e., a bond of M and O).

(Step ii-2) A step of obtaining an argyrodite crystal in which an oxide anion having a Q0 structure having an M-O bond exists in a crystal structure by performing heat treatment on the thus-obtained raw material composition.

Ha is at least one element selected from the group consisting of F, Cl, Br, and I. M is at least one element selected from the group consisting of the metal elements and the semimetal elements belonging to Groups 2 to 14 of the periodic table.

Manufacturing Method (iii)

A manufacturing method (iii) includes the following steps:

(Step iii-1) A step of obtaining an intermediate product by causing raw materials containing Li, P, S, and Ha to react with each other.

(Step iii-2) A step of obtaining a mixture of the thus-obtained intermediate product and an oxide having an M-O bond (i.e., a bond of M and O).

(Step iii-3) A step of obtaining an argyrodite crystal in which an oxide anion having a Q0 structure having an M-O bond exists in a crystal structure by subjecting the thus-obtained mixture to heat treatment.

Ha is at least one element selected from the group consisting of F, Cl, Br, and I. M is at least one element selected from the group consisting of the metal elements and the semimetal elements belonging to Groups 2 to 14 of the periodic table.

Manufacturing Method (iv)

A manufacturing method (iv) includes the following steps:

(Step iv-1) A step of obtaining an argyrodite crystal by mixing together raw materials containing Li, P, S, and Ha and causing crystallization by heating a resulting mixture.

(Step iv-2) A step of obtaining a composition including an oxide anion having a Q0 structure having an M-O bond (i.e., a bond of M and O).

(Step iv-3) A step of obtaining a mixture of the thus-obtained argyrodite crystal and the thus-obtained composition.

(Step iv-4) A step of obtaining an argyrodite crystal in which an oxide anion having a Q0 structure having an M-O bond exists in a crystal structure by subjecting the thus-obtained mixture to heat treatment.

Either of (step iv-1) and (step iv-2) may be performed first. Alternatively, they may be performed at the same time.

Ha is at least one element selected from the group consisting of F, Cl, Br, and I. M is at least one element selected from the group consisting of the metal elements and the semimetal elements belonging to Groups 2 to 14 of the periodic table.

Materials that are known as raw materials for obtaining an argyrodite crystal containing Li, P, S, and Ha may be used as the raw materials containing Li, P, S, and Ha to be used in (step i-1) of the above manufacturing method (i).

An example of the raw materials includes a mixture of a compound containing Li (lithium), a compound containing P (phosphorus), a compound containing S (sulfur), and a compound containing Ha (halogen).

Examples of the compound containing Li include lithium compounds such as lithium sulfide ($Li_2S$), lithium oxide ($Li_2O$), lithium carbonate ($Li_2CO_3$), lithium hydroxide (LiOH), and lithium sulfate ($Li_2SO_4$). The lithium metal simple substance can also be used.

Examples of the compound containing P include phosphorus compounds such as phosphorus sulfides such as diphosphorus trisulfide ($P_2S_3$) and diphosphorus pentasulfide ($P_2S_5$), lithium phosphates ($LiPO_3$, $Li_4P_2O_7$, $Li_3PO_4$), sodium phosphates ($NaPO_3$, $Na_4P_2O_7$, $Na_3PO_4$). The phosphorus simple substance can also be used.

Examples of the compound containing S include lithium sulfide ($Li_2S$, mentioned above), phosphorus sulfides ($P_2S_3$ and $P_2S_5$, mentioned above), and hydrogen sulfide ($H_2S$). The sulfur simple substance can also be used.

Among the compound containing Ha, an example of a compound containing Cl (chlorine) include lithium chloride (LiCl), phosphorus trichloride ($PCl_3$), phosphorus pentachloride ($PCl_5$), diphosphorus tetrachloride ($P_2Cl_4$), phosphoryl chloride ($POCl_3$), sulfur dichloride ($SCl_2$), disulfur dichloride ($S_2Cl_2$), sodium chloride (NaCl), and boron trichloride ($BCl_3$).

Among the compound containing Ha, an example of a compound containing Br (bromine) include lithium bromide (LiBr), phosphorus tribromide ($PBr_3$), phosphoryl bromide ($POBr_3$), disulfur dibromide ($S_2Br_2$), sodium bromide (NaBr), and boron tribromide ($BBr_3$).

Among the above examples, a combination of lithium sulfide, phosphorus sulfide, and at least one of lithium chloride and lithium bromide is preferable.

The above raw materials are very unstable in the air and may decompose when reacting with water to generate hydrogen sulfide gas or be oxidized. It is therefore preferable that they be mixed together in an inert atmosphere.

For example, the raw materials can be mixed together by mixing using a medium such as a planetary ball mill or by medialess mixing such as air-flow mixing or cases using a pin mill or a powder stirrer. The raw materials may be made amorphous by mixing before heating.

An argyrodite crystal is obtained by crystallizing, by heating, raw materials containing Li, P, S, and Ha or amorphous sulfide solid electrolyte materials. It is noted that as mentioned above an argyrodite crystal may contain impurities, such as R, originating from raw materials in such a range that there is no influence on the lithium ion conductivity or heat resistance of a solid electrolyte.

It is preferable that, for example, heating be performed in an inert gas atmosphere, a hydrogen sulfide gas atmosphere, or a sulfur gas atmosphere or under vacuum sealing.

From the viewpoint of accelerating solid-phase reaction, that is, crystallization, it is preferable that the heating temperature be 400° C. or higher, even preferably 450° C. or higher and further preferably 500° C. or higher. On the other hand, from the viewpoint of suppressing thermal decomposition, it is preferable that the heating temperature be lower than 600° C., even preferably 575° C. or lower.

From the same point of view, it is preferable that the heating time be 1 hour or longer, even preferably 2 hours or longer and further preferably 4 hours or longer. On the other hand, it is preferable that the heating time be 100 hours or shorter, even preferably 50 hours or shorter and further preferably 24 hours or shorter.

In (step i-2), a mixture is obtained by mixing an oxide having an M-O bond (i.e., a bond of M and O) with the argyrodite crystal obtained in (step i-1). The oxide having the M-O bond may either be manufactured or be one on the market that is used as it is.

There are no particular limitations on the mixing method; for example, grinding/pulverization mixing may be performed using a ball mill, a bead mill, a homogenizer, a pin mill, or a powder stirrer or by air-flow mixing.

In (step i-3), the mixture obtained in (step i-2) is subjected to heat treatment. As a result, an argyrodite crystal is obtained in which an oxide anion having a Q0 structure having an M-O bond exists in a crystal structure.

A mechanism of this process is unknown. However, the present inventors think that the heat treatment would turn an oxide to an oxide anion having a Q0 structure and cause reconstruction of an argyrodite crystal with this oxide anion having the Q0 structure serving as a crystal nucleus or the oxide anion having the Q0 structure would go into a site of an argyrodite crystal structure. High heat resistance can thereby be obtained.

Although the heat treatment conditions depend on the composition, from the viewpoint of forming an oxide anion having a Q0 structure satisfactorily, it is preferable that the heat treatment temperature be 500° C. or higher, even preferably 600° C. or higher, further preferably 650° C. or higher, and particularly preferably 700° C. or higher. From the viewpoint of lowering the grain boundary resistivity, it is preferable that the heat treatment temperature be 500° C. or higher, even preferably 600° C. or higher. On the other hand, from the viewpoint of preventing thermal decomposition due to an unnecessary high temperature, it is preferable that the heat treatment temperature be 900° C. or lower, even preferably 800° C. or lower. As for the heat treatment atmosphere, it is preferable that, for example, heat treatment be performed in an inert gas atmosphere, a hydrogen sulfide gas atmosphere, or a sulfur gas atmosphere or under vacuum sealing.

For the same reasons, it is preferable that the heat treatment time be 0.1 hour or longer, even preferably 0.25 hour or longer and further preferably 0.5 hour or longer. On the other hand, it is preferable that the heat treatment time be 4 hours or shorter, even preferably 2 hours or shorter and further preferably 1 hour or shorter.

The raw materials containing Li, P, S, and Ha and the oxide having the M-O bond (i.e., a bond of M and O) that are used in (step ii-1) of the manufacturing method (ii) are the same as the raw materials and the oxide having the M-O bond (i.e., a bond of M and O) that are used in (step i-1) and (step i-2) of the manufacturing method (i), respectively.

(Step ii-1) is different from the manufacturing method (i) in that a raw material composition is obtained by mixing together raw materials containing Li, P, S, and Ha and the oxide having the M-O bond before precipitation of the argyrodite crystal from the raw materials.

For example, the raw materials and the oxide having the M-O bond are mixed together in an inert gas atmosphere using a ball mill, a bead mill, a homogenizer, a pin mill, or a powder stirrer or by air-flow mixing.

In (step (ii-2), an argyrodite crystal in which an oxide anion having a Q0 structure having an M-O bond exists in a crystal structure is obtained by performing heat treatment on the material composition obtained in (step ii-1). The heat treatment performed in step (ii-2) is the same as the heat treatment performed in step (i-3) of the manufacturing method (i).

There are no particular limitations on the manufacturing method of an intermediate product that is produced from the raw materials containing Li, P, S, and Ha in (step iii-1) of the manufacturing method (iii). Mechanochemical reaction may be caused using a mixer or a sulfide, and crystal may be produced by heat treatment, or both steps may be performed.

In (step iii-1), an intermediate product is obtained by causing the raw materials to react with each other.

The intermediate product may be either an amorphous sulfide solid electrolyte material or a crystalline sulfide solid electrolyte material. The intermediate product is higher in atmospheric stability than raw materials that are low in atmospheric stability and in the ease of handling.

The conditions of manufacture of the intermediate product from raw materials may be changed according to a target solid electrolyte.

In (step iii-2), a mixture of the intermediate product obtained in (step iii-1) and an oxide having an M-O bond (i.e., a bond of M and O) is obtained. This oxide having the M-O bond (i.e., a bond of M and O) is the same as the oxide having the M-O bond (i.e., a bond of M and O) that is obtained in (step i-2) of the manufacturing method (i).

The intermediate product and the oxide having the M-O bond may be mixed together in a dry inert atmosphere. Alternatively, from the viewpoint of manufacturing cost reduction, they may be mixed together, for example, in a dry air atmosphere using a ball mill, a bead mill, a homogenizer, a pin mill, or a powder stirrer or by air-flow mixing.

In (step iii-3), an argyrodite crystal in which the oxide anion having an M-O bond (i.e., a bond of M and O) exists in a crystal structure is obtained by subjecting the mixture obtained in (step iii-2) to heat treatment. The heat treatment performed in step (iii-3) is the same as that performed in step (i-3) of the manufacturing method (i).

(Step iv-1) of the manufacturing method (iv) is the same as (step i-1) of the manufacturing method (i).

In (step iv-2), a composition including an oxide anion having a Q0 structure having an M-O bond (i.e., a bond of M and O) is obtained. More specifically, a composition existing as an oxide anion having a Q0 structure is obtained using the same oxide as the oxide having the M-O bond (i.e., a bond of M and O) that is used in (step i-2) of the manufacturing method (i).

For example, the argyrodite crystal in which an oxide anion having a Q0 structure having an M-O bond exists in a crystal structure and that is obtained a method such as the manufacturing methods (i) to (iii) may be used as the above-mentioned composition.

Furthermore, the composition is not limited to an argyrodite crystal and may be a crystal having another crystal structure as long as it is a composition in which an oxide exists as an oxide anion having a Q0 structure. Still further, the composition is not limited to a crystal and may be an amorphous composition.

In (step iv-3), a mixture of the argyrodite crystal obtained in (step iv-1) and the composition obtained in (step iv-2) is obtained.

For example, the argyrodite crystal and the composition are mixed together in a dry inert atmosphere using a ball mill, a bead mill, a homogenizer, a pin mill, or a powder stirrer or by air-flow mixing.

In (step iv-4), an argyrodite crystal in which the oxide anion having a Q0 structure having an M-O bond (i.e., a bond of M and O) exists in a crystal structure is obtained by performing heat treatment on the mixture obtained in (step iv-3). The heat treatment performed in (step iv-4) is the same as that performed in step (i-3) of the manufacturing method (i).

It is inferred that by performing the heat treatment in step (iv-4) an oxide anion having a Q0 structure contained in the composition obtained in step (iv-2) goes into the argyrodite crystal structure obtained in (step iv-1) and causes reconstruction.

EXAMPLES

Although the present invention will be described below in a specific manner using Inventive Examples, the present invention is not limited to them.

Examples 2-5, Examples 7-9, Examples 11-16, Examples 18-28, Examples 30-34, Example 36, Example 38, Example 39, Example 41, Example 42, Example 44, Example 46, Example 48, Example 50, Examples 52-54, Examples 1-1 to 1-3, Examples 2-1 to 2-3, and Examples 3-1 to 3-10 are Inventive Examples. On the other hand, Example 1, Example 6, Example 10, Example 17, Example 29, Example 35, Example 37, Example 40, Example 43, Example 45, Example 47, Example 49, and Example 51 are Comparative Examples.

[Evaluation]A measurement sample was produced by pressing a powder obtained into a green compact at a pressure of 380 kN and lithium ion conductivity was measured using an AC impedance measuring instrument (a potentiostat/galvanostat "VSP" produced by Bio-Logic Sciences Instruments).

As for measurement conditions, the measurement frequency range was 100 Hz to 1 MHz, the measurement voltage was 100 mV, and the measurement temperature was 25° C.

Example 1

A lithium sulfide powder (produced by Sigma-Aldrich Co. LLC, purity: 99.98%), a diphosphorus pentasulfide powder (produced by Sigma-Aldrich Co. LLC, purity: 99%), and a lithium chloride powder (produced by Sigma-Aldrich Co. LLC, purity: 99.99%) were weighed in a dry nitrogen atmosphere so as to obtain an element ratio shown in Table 1, and mixed together at 400 rpm for 4 hours in the same atmosphere using a planetary ball mill.

Then a resulting mixture was vacuum-sealed in a carbon-coated quartz pipe and heated at 550° C. for 5 hours, whereby an argyrodite crystal of $Li_6PS_5Cl$ was obtained.

The thus-obtained crystal was formed into a pellet, again vacuum-sealed in a carbon-coated quartz pipe, and heat-treated at 650° C. for 30 minutes, whereby a sulfide solid electrolyte was obtained.

Lithium ion conductivity of the argyrodite crystal of $Li_6PS_5Cl$ before the heat treatment was 2.7 mS/cm and lithium ion conductivity of the thus-obtained sulfide solid electrolyte was 1.1 mS/cm.

A value of $\{(M+O)/(Li+P+S+Ha+M+O)\}$, a value of $\{\beta(\alpha+\beta)\}$, and a value of (D+0.1) that were obtained using element proportions of elements constituting the crystal and elements constituting the oxide anion are also shown in the table. Each of empty element proportion boxes in the table means that the element concerned is not contained, that is, it has the same meaning as "0.000."

Example 2

An $SiO_2$ powder (obtained by grinding or pulverizing an "SJT series" quartz test tube produced by AS ONE Corporation) was added to an argyrodite crystal of $Li_6PS_5Cl$ obtained in the same manner as in Example 1, and they were mixed together in a mortar into a mixture. The addition amount of the $SiO_2$ powder was adjusted so that the Si and O element proportions became equal to values shown in Table 1.

The thus-obtained mixture was formed into a pellet in the same manner as in the Example 1, again vacuum-sealed in a carbon-coated quartz pipe, and heat-treated at 650° C. for 30 minutes, whereby a sulfide solid electrolyte including an argyrodite crystal in which an oxide anion having a Q0 structure having an Si—O bond existed was obtained.

Lithium ion conductivity of the thus-obtained sulfide solid electrolyte is shown in Table 1.

Incidentally, the above compositions $Li_6PS_5Cl$ and $SiO_2$ of the argyrodite crystal and the oxide, respectively, are preparation (raw material) compositions and hence are different from actual compositions in a strict sense. However, results of ICP atomic emission spectrometry analyses of the elements P and S, an atomic absorption spectrometry analysis of the element Li, an ion chromatograph analysis of the element Cl show that the differences are at most ±10% and do not influence results or considerations. The same is true of the other Examples.

Examples 3-5

A sulfide solid electrolyte including an argyrodite crystal in which an oxide anion having a Q0 structure having an Si—O bond existed was obtained in the same manner as in Example 2 except that the addition amount of the $SiO_2$ powder which is an oxide was changed so as to provide values shown in Table 1. Lithium ion conductivity of each of the thus-obtained sulfide solid electrolytes is shown in Table 1.

Examples 6-34

A sulfide solid electrolyte including an argyrodite crystal in which an oxide anion having a Q0 structure having an M-O bond existed was obtained in the same manner as in Example 2 except that the element ratio of the argyrodite crystal and the kind and the addition amount of the oxide were changed to the ones shown in Table 1 or 2. As in Example 1, in Examples 6, 10, 17, and 29, a sulfide solid electrolyte was obtained by performing heat treatment without incorporation of an oxide.

Lithium ion conductivity of each of the argyrodite crystals before being subjected to the heat treatment and the thus-obtained sulfide solid electrolyte is shown in Table 1 or 2.

In the case where Br was contained in the crystal, a lithium bromide powder (produced by Sigma-Aldrich Co. LLC, purity: 99.995%) was used as a Br source. In the case where Al was contained as the oxide anion, an $Al_2O_3$ powder ("Type CG-20" produced by Sigma-Aldrich Co. LLC) was used. In the case where Zr was contained as the oxide anion, a $ZrO_2$ powder (produced by Sigma-Aldrich Co. LLC, purity: 99%) was used.

TABLE 1

| | Crystal | | | | | | | Oxide anion | |
|---|---|---|---|---|---|---|---|---|---|
| | | Element ratio | | | | | Lithium ion conductivity | M | |
| Example | Composition | Li | P | S | Cl | Br | (mS/cm) | Si | Al |
| 1 | $Li_6PS_5Cl$ | 6 | 1 | 5 | 1 | | 2.7 | 0.0000 | |
| 2 | | 6 | 1 | 5 | 1 | | | 0.0027 | |
| 3 | | 6 | 1 | 5 | 1 | | | 0.0223 | |
| 4 | | 6 | 1 | 5 | 1 | | | 0.0447 | |
| 5 | | 6 | 1 | 5 | 1 | | | 0.1340 | |
| 6 | $Li_{5.75}PS_{4.75}Cl_{1.25}$ | 5.75 | 1 | 4.75 | 1.25 | | 3 | 0.0000 | |
| 7 | | 5.75 | 1 | 4.75 | 1.25 | | | 0.0223 | |
| 8 | | 5.75 | 1 | 4.75 | 1.25 | | | 0.0890 | |
| 9 | | 5.75 | 1 | 4.75 | 1.25 | | | 0.2226 | |
| 10 | $Li_{5.5}PS_{4.5}Cl_{1.5}$ | 5.5 | 1 | 4.5 | 1.5 | | 3.5 | 0.0000 | |
| 11 | | 5.5 | 1 | 4.5 | 1.5 | | | 0.0222 | |
| 12 | | 5.5 | 1 | 4.5 | 1.5 | | | 0.0887 | |
| 13 | $Li_{5.5}PS_{4.5}Br_{1.5}$ | 5.5 | 1 | 4.5 | 0 | 1.5 | 3.3 | 0.1109 | |
| 14 | $Li_{5.5}PS_{4.5}Cl_{1.5}$ | 5.5 | 1 | 4.5 | 1.5 | | 3.5 | 0.2219 | |
| 15 | | 5.5 | 1 | 4.5 | 1.5 | | | 0.3550 | |
| 16 | | 5.5 | 1 | 4.5 | 1.5 | | | 0.5325 | |

| | Oxide anion | | | Solid electrolyte | | | |
|---|---|---|---|---|---|---|---|
| | | | | Lithium ion | (M + O)/ (Li + P + | β/ | |
| Example | M Zr | O | M + O | conductivity (mS/cm) | S + Ha + M + O) | (α + β) | D + 0.1 |
| 1 | | 0.0000 | 0.0000 | 1.1 | 0.0000 | 0.0000 | 0.0971 |
| 2 | | 0.0054 | 0.0080 | 2.9 | 0.0006 | 0.0006 | 0.0971 |
| 3 | | 0.0447 | 0.0670 | 2.0 | 0.0051 | 0.0051 | 0.0971 |
| 4 | | 0.0893 | 0.1340 | 2.2 | 0.0102 | 0.0102 | 0.0971 |
| 5 | | 0.2680 | 0.4020 | 1.9 | 0.0300 | 0.0300 | 0.0971 |
| 6 | | 0.0000 | 0.0000 | 0.5 | 0.0000 | 0.0000 | 0.1247 |
| 7 | | 0.0445 | 0.0668 | 1.1 | 0.0052 | 0.0052 | 0.1247 |
| 8 | | 0.1781 | 0.2671 | 2.4 | 0.0205 | 0.0205 | 0.1247 |
| 9 | | 0.4452 | 0.6678 | 2.2 | 0.0498 | 0.0498 | 0.1247 |
| 10 | | 0.0000 | 0.0000 | 0.7 | 0.0000 | 0.0000 | 0.1523 |
| 11 | | 0.0444 | 0.0666 | 1.4 | 0.0053 | 0.0053 | 0.1523 |
| 12 | | 0.1775 | 0.2662 | 2.3 | 0.0209 | 0.0209 | 0.1523 |
| 13 | | 0.2219 | 0.3328 | 2.8 | 0.0259 | 0.0259 | 0.1523 |
| 14 | | 0.4437 | 0.6656 | 4.3 | 0.0506 | 0.0506 | 0.1523 |
| 15 | | 0.7100 | 1.0650 | 4.0 | 0.0785 | 0.07S5 | 0.1523 |
| 16 | | 1.0650 | 1.5975 | 3.0 | 0.1133 | 0.1133 | 0.1523 |

TABLE 2

| | Crystal | | | | | | | | | |
|---|---|---|---|---|---|---|---|---|---|---|
| | | Element ratio | | | | | Lithium ion conductivity | Oxide anion M | | |
| Example | Composition | Li | P | S | Cl | Br | (mS/cm) | Si | Al | Zr |
| 17 | $Li_{5.4}PS_{4.4}Cl_{1.6}$ | 5.4 | 1 | 4.4 | 1.6 | | 3.2 | 0.0000 | | |
| 18 | | 5.4 | 1 | 4.4 | 1.6 | | | 0.0027 | | |
| 19 | | 5.4 | 1 | 4.4 | 1.6 | | | 0.0222 | | |
| 20 | | 5.4 | 1 | 4.4 | 1.6 | | | 0.0443 | | |
| 21 | | 5.4 | 1 | 4.4 | 1.6 | | | | 0.0522 | |
| 22 | | 5.4 | 1 | 4.4 | 1.6 | | | | | 0.0216 |
| 23 | | 5.4 | 1 | 4.4 | 1.6 | | | 0.1329 | | |
| 24 | | 5.4 | 1 | 4.4 | 1.6 | | | | 0.1567 | |
| 25 | | 5.4 | 1 | 4.4 | 1.6 | | | | | 0.0648 |
| 26 | | 5.4 | 1 | 4.4 | 1.6 | | | 0.2659 | | |
| 27 | $Li_{5.4}PS_{4.4}ClBr_{0.6}$ | 5.4 | 1 | 4.4 | 1 | 0.6 | 2.7 | 0.2925 | | |
| 28 | $Li_{5.4}PS_{4.4}Cl_{1.6}$ | 5.4 | 1 | 4.4 | 1.6 | | 3.2 | 0.5318 | | |
| 29 | $Li_{5.3}PS_{4.3}Cl_{1.7}$ | 5.3 | 1 | 4.3 | 1.7 | | 2.4 | 0.0000 | | |
| 30 | | 5.3 | 1 | 4.3 | 1.7 | | | 0.0221 | | |
| 31 | | 5.3 | 1 | 4.3 | 1.7 | | | 0.0885 | | |
| 32 | | 5.3 | 1 | 4.3 | 1.7 | | | 0.2213 | | |
| 33 | | 5.3 | 1 | 4.3 | 1.7 | | | 0.3540 | | |
| 34 | | 5.3 | 1 | 4.3 | 1.7 | | | 0.5311 | | |

| | | | Solid electrolyte | | | |
|---|---|---|---|---|---|---|
| | Oxide anion | | Lithium ion | (M + O)/ (Li + P + | β/ | |
| Example | O | M + O | conductivity (mS/cm) | S + HA + M + O) | (α + β) | D + 0.1 |
| 17 | 0.0000 | 0.0000 | 0.5 | 0.0000 | 0.0000 | 0.1633 |
| 18 | 0.0053 | 0.0080 | 0.9 | 0.0006 | 0.0006 | 0.1633 |
| 19 | 0.0443 | 0.0665 | 1.2 | 0.0053 | 0.0053 | 0.1633 |
| 20 | 0.0886 | 0.1329 | 2.4 | 0.0106 | 0.0106 | 0.1633 |
| 21 | 0.0783 | 0.1306 | 3.3 | 0.0104 | 0.0104 | 0.1633 |
| 22 | 0.0432 | 0.0648 | 1.6 | 0.0052 | 0.0052 | 0.1633 |
| 23 | 0.2659 | 0.3988 | 2.6 | 0.0312 | 0.0312 | 0.1633 |
| 24 | 0.2350 | 0.3917 | 3.0 | 0.0306 | 0.0306 | 0.1633 |
| 25 | 0.1296 | 0.1945 | 1.9 | 0.0154 | 0.0154 | 0.1633 |
| 26 | 0.5318 | 0.7977 | 4.8 | 0.0604 | 0.0604 | 0.1633 |
| 27 | 0.5850 | 0.8776 | 8.4 | 0.0661 | 0.0661 | 0.1633 |
| 28 | 1.0636 | 1.5953 | 4.4 | 0.1140 | 0.1140 | 0.1633 |
| 29 | 0.0000 | 0.0000 | 0.7 | 0.0000 | 0.0000 | 0.1744 |
| 30 | 0.0443 | 0.0664 | 1.1 | 0.0054 | 0.0054 | 0.1744 |
| 31 | 0.1770 | 0.2655 | 2.6 | 0.0211 | 0.0211 | 0.1744 |
| 32 | 0.4426 | 0.6638 | 4.3 | 0.0512 | 0.0512 | 0.1744 |
| 33 | 0.7081 | 1.0621 | 4.4 | 0.0795 | 0.0795 | 0.1744 |
| 34 | 1.0621 | 1.5932 | 4.0 | 0.1147 | 0.1147 | 0.1744 |

Examples 35-44

A lithium sulfide powder (produced by Sigma-Aldrich Co. LLC, purity: 99.98%), a diphosphorus pentasulfide powder (produced by Sigma-Aldrich Co. LLC, purity: 99%), a lithium chloride powder (produced by Sigma-Aldrich Co. LLC, purity: 99.99%), a lithium bromide powder (produced by Sigma-Aldrich Co. LLC, purity: 99.995%), and an $SiO_2$ powder (obtained by grinding or pulverizing an "SJT series" quartz test tube produced by AS ONE Corporation) were weighed in a dry nitrogen atmosphere so as to obtain an element ratio shown in Table 3, and mixed together using a mortar, whereby a material composition was obtained.

The thus-obtained material composition was vacuum-sealed in a carbon-coated quartz pipe and heat-treated at 750° C. for 1 hour, whereby a sulfide solid electrolyte or a sulfide solid electrolyte including an argyrodite crystal in which an oxide anion having a Q0 structure having an M-O bond.

Lithium ion conductivity of each of the thus-obtained sulfide solid electrolytes is shown in Table 3.

TABLE 3

| Example | Composition | Crystal: Element ratio Li | P | S | Cl | Br | Oxide anion: M Si | O | M + O | Solid electrolyte: Lithium ion conductivity (mS/cm) | (M + O)/(Li + P + S + Ha + M + O) | β/(α + β) | D + 0.1 |
|---|---|---|---|---|---|---|---|---|---|---|---|---|---|
| 35 | $Li_6PS_5Cl$ | 6 | 1 | 5 | 1 | | 0.0000 | 0.0000 | 0.0000 | 0.8 | 0.0000 | 0.0000 | 0.0971 |
| 36 | | 6 | 1 | 5 | 1 | | 0.0447 | 0.0893 | 0.1340 | 2.0 | 0.0102 | 0.0102 | 0.0971 |
| 37 | $Li_{5.5}PS_{4.5}Cl_{1.5}$ | 5.5 | 1 | 4.5 | 1.5 | | 0.0000 | 0.0000 | 0.0000 | 0.5 | 0.0000 | 0.0000 | 0.1523 |
| 38 | $Li_{5.5}PS_{4.5}Br_{1.5}$ | 5.5 | 1 | 4.5 | 0 | 1.5 | 0.1109 | 0.2219 | 0.3328 | 4.2 | 0.0259 | 0.0259 | 0.1523 |
| 39 | $Li_{5.5}PS_{4.5}Cl_{1.5}$ | 5.5 | 1 | 4.5 | 1.5 | | 0.2219 | 0.4437 | 0.6656 | 4.1 | 0.0506 | 0.0506 | 0.1523 |
| 40 | $Li_{5.4}PS_{4.4}Cl_{1.6}$ | 5.4 | 1 | 4.4 | 1.6 | | 0.0000 | 0.0000 | 0.0000 | 0.3 | 0.0000 | 0.0000 | 0.1633 |
| 41 | | 5.4 | 1 | 4.4 | 1.6 | | 0.2659 | 0.5318 | 0.7977 | 6.2 | 0.0604 | 0.0604 | 0.1633 |
| 42 | $Li_{5.4}PS_{4.4}ClBr_{0.6}$ | 5.4 | 1 | 4.4 | 1 | 0.6 | 0.2925 | 0.5850 | 0.8776 | 8.5 | 0.0661 | 0.0661 | 0.1633 |
| 43 | $Li_{5.3}PS_{4.3}Br_{1.7}$ | 5.3 | 1 | 4.3 | 1.7 | | 0.0000 | 0.0000 | 0.0000 | 0.5 | 0.0000 | 0.0000 | 0.1744 |
| 44 | | 5.3 | 1 | 4.3 | 1.7 | | 0.2213 | 0.4426 | 0.6638 | 4.2 | 0.0512 | 0.0512 | 0.1744 |

Examples 45-52

Each of the sulfide solid electrolytes obtained in Example 1, Example 4, Example 17, Example 26, Example 35, Example 36, Example 40, and Example 41 was heat-treated again at 650° C. for 30 minutes. A change between lithium ion conductivity values obtained before and after the reheat treatment on each of the sulfide solid electrolytes is shown in Table 4.

Incidentally, the lithium ion conductivity obtained after the reheat treatment is a value that was estimated based on the facts that in Examples 1 and 17 the conductivity was decreased to a half value or a smaller by heat treatment of 650° C. and 30 minutes and in Examples 4 and 27 the conductivity decreased by a small value or increased. In each of Examples 49-52, no crystal was formed before the mixing with the oxide because of the manufacturing method. Thus, to indicate that there was no lithium ion conductivity, the box of lithium ion conductivity in the column "crystal" in Table 4 is made empty.

TABLE 4

| Example | Composition | Crystal: Element ratio Li | P | S | Cl | Crystal: Lithium ion conductivity (mS/cm) | Oxide anion: M Si | O | M + O | Solid electrolyte: Lithium ion conductivity before reheat treatment (mS/cm) | Lithium ion conductivity after reheat treatment (mS/cm) | (M + O)/(Li + P + S + Ha + M + O) | β/(α + β) | D + 0.1 |
|---|---|---|---|---|---|---|---|---|---|---|---|---|---|---|
| 45 | $Li_6PS_5Cl$ | 6 | 1 | 5 | 1 | 2.7 | 0.0000 | 0.0000 | 0.0000 | 1.1 | 0.01-0.5 | 0.0000 | 0.0000 | 0.0971 |
| 46 | | 6 | 1 | 5 | 1 | | 0.0447 | 0.0893 | 0.1340 | 2.2 | 1-3 | 0.0102 | 0.0102 | 0.0971 |
| 47 | $Li_{5.4}PS_{4.4}Cl_{1.6}$ | 5.4 | 1 | 4.4 | 1.6 | 3.2 | 0.0000 | 0.0000 | 0.0000 | 0.5 | 0.01-0.2 | 0.0000 | 0.0000 | 0.1633 |
| 48 | | 5.4 | 1 | 4.4 | 1.6 | | 0.2659 | 0.5318 | 0.7977 | 4.8 | 3-6 | 0.0604 | 0.0604 | 0.1633 |
| 49 | $Li_6PS_5Cl$ | 6 | 1 | 5 | 1 | | 0.0000 | 0.0000 | 0.0000 | 0.8 | 0.01-0.5 | 0.0000 | 0.0000 | 0.0971 |
| 50 | | 6 | 1 | 5 | 1 | | 0.0447 | 0.0893 | 0.1340 | 2.0 | 1-3 | 0.0102 | 0.0102 | 0.0971 |
| 51 | $Li_{5.4}PS_{4.4}Cl_{1.6}$ | 5.4 | 1 | 4.4 | 1.6 | | 0.0000 | 0.0000 | 0.0000 | 0.3 | 0.01-0.2 | 0.0000 | 0.0000 | 0.1633 |
| 52 | | 5.4 | 1 | 4.4 | 1.6 | | 0.2659 | 0.5318 | 0.7977 | 6.2 | 3-6 | 0.0604 | 0.0604 | 0.1633 |

Example 53

An equimolar mixture of the sulfide solid electrolyte of Example 35 and the sulfide solid electrolyte of Example 36 including an oxide anion having a Q0 structure having an M-O bond is obtained. The mixture is heat-treated at 650° C. for 30 minutes, whereby a sulfide solid electrolyte including an argyrodite crystal in which an oxide anion having a Q0 structure an M-O bond exists is obtained.

A change between lithium ion conductivity values to be obtained before and after the heat treatment is shown in Table 5. It is noted that element proportions of each of the crystal and the oxide anion of the mixture are averages of element proportions of Examples 35 and 36. A value range that is conceivable when the values of Examples 1-5 shown in Table 1 are referred to is shown as lithium ion conductivity before the heat treatment. Lithium ion conductivity after the heat treatment is a value that was estimated in the same manner as in Examples 45-52.

Example 54

A sulfide solid electrolyte including an argyrodite crystal in which an oxide anion having a Q0 structure having an M-O bond exists is obtained in the same manner as in Example 53 except that the sulfide solid electrolyte of Example 40 is used in place of that of Example 35 and the sulfide solid electrolyte including an oxide anion having a Q0 structure having an M-O bond of Example 41 is used in place of that of Example 36.

A change between lithium ion conductivity values to be obtained before and after the heat treatment is calculated in the same manner as in Example 53. A result is shown in Table 5.

the use of an argyrodite crystal having such a composition provides both advantages of increase in bulk ion conductivity and reduction in grain boundary resistivity in a sintering step. Based on such high-temperature stability, the present inventors think that the estimated results shown in Table 4 would be proper.

As seen from the results shown in Table 3, the above advantages were still found and very high thermal stability was obtained even if the heat treatment temperature was further increased to 750° C. Furthermore, a sulfide solid electrolyte having oxide anion having a Q0 structure in a crystal structure was obtained even when a material composition that was a mixture of raw materials of Li, P, S, and Ha and an oxide was subjected to heat treatment without formation of an argyrodite crystal. That is, it was confirmed that a sulfide solid electrolyte having a desired structure could be found by performing heat treatment either after obtaining an argyrodite crystal in advance or at the time of causing crystallization.

Furthermore, from the results shown in Table 5, it is inferred that when heat treatment is performed on a mixture of a composition including an oxide anion having a Q0 structure and an argyrodite crystal not including an oxide, the oxide anion having the Q0 structure in the composition goes into the argyrodite crystal structure to cause reconstruction, whereby a sulfide solid electrolyte that is stable at a high temperature can be obtained.

The sulfide solid electrolyte of Example 4 to which an $SiO_2$ powder which is an oxide was added was subjected to a synchrotron X-ray diffraction measurement and a structure refinement analysis by the Rietveld method. And three kinds of interionic distances that were conceivable as a distance of a lithium ion movement route in an argyrodite crystal

TABLE 5

| | Crystal | | | | | Oxide anion | | | Solid electrolyte | | | | |
|---|---|---|---|---|---|---|---|---|---|---|---|---|---|
| | | Element ratio | | | | M | | M + | Lithium ion conductivity before heat treatment | Lithium ion conductivity after heat treatment | (M + O)/(Li + P + S + Ha + M + O) | β/(α + β) | D + |
| Example | Composition | Li | P | S | Cl | Si | O | O | (mS/cm) | (mS/cm) | | | 0.1 |
| 53 | $Li_6PS_5Cl$ | 6 | 1 | 5 | 1 | 0.0223 | 0.0447 | 0.0670 | 1-2 | 1-2 | 0.0051 | 0.0051 | 0.0971 |
| 54 | $Li_{5.4}PS_{4.4}Cl_{1.6}$ | 6 | 1 | 5 | 1 | 0.1329 | 0.2659 | 0.3988 | 2-6 | 2-6 | 0.0298 | 0.0298 | 0.0971 |

As seen from the results shown in Tables 1 and 2, the lithium ion conductivity of the sulfide solid electrolyte was decreased to a half value or smaller, in some cases, to 20% or smaller, by the heat treatment of 650° C. and 30 minutes in the case where the sulfide solid electrolyte did not include an oxide anion having a Q0 structure in a crystal structure. This means that the crystal was thermally decomposed by such heat treatment. On the other hand, it was confirmed that in the sulfide solid electrolyte including an oxide anion having a Q0 structure in a crystal structure, the lithium ion conductivity decrease rate lowered and the high-temperature stability was increased. Furthermore, lithium ion conductivity that was higher than before the heat treatment was obtained depending on the crystal structure and the type and amount of the oxide anion. This is considered due to reconstruction into an argyrodite crystal that is very high in high-temperature stability and is increased in lithium ion conductivity by the heat treatment. It is also considered that structure, that is, (1) a lithium site 48 h-24 g-48 h distance (doublet jump distance), (2) an intra-cage jump distance, and (3) an inter-cage jump distance, were calculated (J. Am. Chem. Soc. 2017, 139, pp. 10,909-10,918, FIG. 1). As a result, in Example 4, the distances (1), (2), and (3) were calculated to be 2.26396 Å, 2.28013 Å, and 2.42153 Å, respectively. A lattice constant was also calculated. In Example 4, the lattice constant was calculated to be 9.85087 Å. Incidentally, the distances (1), (2), and (3) of the argyrodite crystal ($Li_6PS_5Cl$) having the basic structure that is shown in J. Am. Chem. Soc. 2017, 139, pp. 10,909-10,918, FIG. 1 are 1.95772 Å, 2.25333 Å, and 2.76089 Å, respectively. According to the same document, the lattice constant of the argyrodite crystal having the basic structure is 9.85980 Å.

Examples 1-1 to 1-3

A lithium sulfide powder (produced by Sigma-Aldrich Co. LLC, purity: 99.98%), a diphosphorus pentasulfide powder (produced by Sigma-Aldrich Co. LLC, purity: 99%), and a lithium chloride powder (produced by Sigma-Aldrich Co. LLC, purity: 99.99%) were weighed in a dry nitrogen atmosphere so as to obtain an element ratio shown in Table 6 and mixed together at 400 rpm for 4 hours in the same atmosphere using a planetary ball mill. Then a resulting mixture was vacuum-sealed in a carbon-coated quartz pipe and heated at 450° C. for 5 hours, whereby an argyrodite crystal was obtained. It is noted that a lithium bromide powder (produced by Sigma-Aldrich Co. LLC, purity: 99.995%) was used as a Br source in the case where Br was contained in the crystal.

An $SiO_2$ powder (obtained by grinding or pulverizing an "SJT series" quartz test tube produced by AS ONE Corporation) was added to the obtained argyrodite crystal and they were mixed together in a mortar into a mixture. The addition amount of the $SiO_2$ powder was adjusted so that the Si and O element proportions became equal to values shown in Table 6.

The thus-obtained mixture was formed into a pellet, vacuum-sealed in a quartz pipe, and heat-treated at 750° C. for 30 minutes, whereby a sulfide solid electrolyte including an argyrodite crystal in which an oxide anion having a Q0 structure having an Si—O bond existed was obtained. The argyrodite crystal obtained in each of Examples 1-2 and 1-3 included Cl and Br as Ha. When the Cl content and Br content in the argyrodite crystal are represented by x (at %) and y (at %), respectively, x/y was equal to 7 in Example 1-2 and 1 in Example 1-3.

Lithium ion conductivity of each of the argyrodite crystal before being subjected to the heat treatment and the thus-obtained sulfide solid electrolyte is shown in Table 6.

Composition Analysis Method

A sulfide solid electrolyte powder weighed in a glove box was dissolved in an alkali aqueous solution and composition analyses were performed by employing ICP atomic emission spectrometry (instrument: type name "PS3520UVDD11" produced by Hitachi High-Tech Corporation) for P, S, and Si, atomic absorption spectrometry (instrument: type name "ZA3300" produced by Hitachi High-Tech Corporation; at the time of an Li measurement, CsCl was added so as to obtain a solution of concentration 0.1%) for Li, and ion chromatography (instrument: type name "ICS-2100" (column: AS11HC) produced by Thermo Fisher Scientific Inc., a measurement was performed in a state that a small amount of $H_2O_2$ was added and dilution with ultra pure water was made) for elements Cl and Br.

The sulfide solid electrolyte obtained in each of Examples 2-1 to 2-3 was subjected to dry grinding or pulverization by a planetary ball mill (type name "LP-4" produced by Ito Seisakusho Co., Ltd.) using alumina balls having a particle diameter of 2 mm and caused to pass through a sieve having openings of 43 m, whereby a sulfide solid electrolyte powder having a particle size distribution with D50 being 3 μm. Each lithium ion conductivity shown in Table 7 is a measurement value obtained before the grinding or pulverization. All operations were performed in a dry nitrogen atmosphere. A particle size distribution was measured using a laser diffraction particle size distribution measuring instrument "MT3300EX II" produced by Microtrac and an average particle diameter (D50) was measured from a chart of the thus-obtained volume-based particle size distribution.

TABLE 6

| | Crystal | | | | | | | | | | | | Solid electrolyte | | | |
|---|---|---|---|---|---|---|---|---|---|---|---|---|---|---|---|---|
| | | Element ratio | | | | | Lithium ion conductivity | Oxide anion | | | | | Lithium ion conductivity | (M + O)/(Li + P + S + Ha + M + O) | β/(α + β) | D + 0.1 |
| | | | | | | | | M | | | | M + | | | | |
| Example | Composition | Li | P | S | Cl | Br | (mS/cm) | Si | Al | Zr | O | O | (mS/cm) | | | |
| 1-1 | $Li_{5.5}PS_{4.4}Cl_{1.6}$ | 5.5 | 1 | 4.4 | 1.6 | 0.0 | 3.0 | 0.2 | | | 0.4 | 0.6 | 6.8 | 0.0458 | 0.0458 | 0.1633 |
| 1-2 | $Li_{5.5}PS_{4.4}Cl_{1.4}Br_{0.2}$ | 5.5 | 1 | 4.4 | 1.4 | 0.2 | 3.5 | 0.2 | | | 0.4 | 0.6 | 7.5 | 0.0458 | 0.0458 | 0.1633 |
| 1-3 | $Li_{5.5}PS_{4.4}Cl_{0.8}Br_{0.8}$ | 5.5 | 1 | 4.4 | 0.8 | 0.8 | 2.9 | 0.2 | | | 0.4 | 0.6 | 8.8 | 0.0458 | 0.0458 | 0.1633 |

Examples 2-1 to 2-3

Cycle characteristics of an all-solid-state lithium-ion secondary battery that employed the sulfide solid electrolyte of each of Examples 1-1 to 1-3 were evaluated.

Production of Solid Electrolyte Powder

First, the sulfide solid electrolyte of each of Examples 1-1, 1-2, and 1-3 was put in a carbon container and heat-treated by heating it at 450° C. for 60 minutes in an N2 atmosphere having a dew point of −60° C. or lower, whereby a sulfide solid electrolyte of each of Examples 2-1, 2-2, and 2-3 was obtained.

Composition formula and lithium ion conductivity of the sulfide solid electrolyte of each of Examples 2-1, 2-2, and 2-3 are shown in Table 7. This composition formula is one obtained by the following composition analysis method. It is noted that the proportion of O was made two times that of Si.

Production of Positive Electrode Composite Member

A positive electrode composite member was produced by using, as a positive electrode active material, a $LiNbO_3$-coated bedded rock salt $LiCoO_2$ powder (volume-average particle diameter: 10 μm) and mixing the sulfide solid electrolyte powder produced above (35 parts by mass), the positive electrode active material (60 parts by mass), and a conductive agent (acetylene black "HS100" produced by Denka Company Limited, 5 parts by mass). The thickness of the $LiNbO_3$ coat determined by a TEM observation was 7 nm.

Production of all-Solid-State Lithium-Ion Secondary Battery

A solid electrolyte layer was formed by putting the sulfide solid electrolyte produced above (80 mg) into a plastic cylinder having a diameter of 10 mm and subjecting the sulfide solid electrolyte to pressure molding. Then a positive electrode layer was formed by putting the positive electrode composite member produced above (10 mg) into the same cylinder and performing pressure molding again. A negative electrode layer was formed by putting an indium foil and a lithium foil from the side opposite to the positive electrode composite member. An all-solid-state lithium-ion secondary battery was produced in this manner and subjected to a charging/discharging test with a confining pressure of 10 kN.

Charging/Discharging Test

A 100-cycle constant current charging/discharging test was performed at 25° C. with a charging/discharging current density of 0.1 C and a charging/discharging potential range of 1.9 to 3.7 V using each all-solid-state lithium-ion secondary battery thus produced. A capacity retention rate (%) that is given by the following equation was determined from results of the charging/discharging test and cycle characteristics of the all-solid-state lithium-ion secondary battery were evaluated. A capacity retention rate (%) of each Examples is shown in Table 7.

(capacity retention rate (%))={(discharge capacity at 100th cycle)/(discharge capacity at first cycle)}×100.

TABLE 7

| | Crystal | | | | | | | | | | | Solid electrolyte | | | | Lithium ion secondary battery |
|---|---|---|---|---|---|---|---|---|---|---|---|---|---|---|---|---|
| | | Element ratio | | | | | Oxide anion | | | | | Lithium ion conductivity before grinding/ pulverization | (M + O)/ (Li + P + S + Ha + | β/ (α + | D + | Capacity retention rate |
| | | | | | | | M | | | | M + | | | | | |
| Example | Composition | Li | P | S | Cl | Br | Si | Al | Zr | O | O | (mS/cm) | M + O) | β) | 0.1 | (%) |
| 2-1 | $Li_{5.5}PS_{4.3}Cl_{1.7}$ | 5.5 | 1 | 4.3 | 1.7 | 0.0 | 0.2 | | | 0.4 | 0.6 | 7.6 | 0.0458 | 0.0458 | 0.1744 | 85 |
| 2-2 | $Li_{5.6}PS_{4.3}Cl_{1.5}Br_{0.2}$ | 5.6 | 1 | 4.3 | 1.5 | 0.2 | 0.2 | | | 0.4 | 0.6 | 8.1 | 0.0455 | 0.0455 | 0.1744 | 90 |
| 2-3 | $Li_{5.6}PS_{4.3}Cl_{0.8}Br_{0.8}$ | 5.6 | 1 | 4.3 | 0.8 | 0.8 | 0.2 | | | 0.4 | 0.6 | 10.0 | 0.0458 | 0.0458 | 0.1633 | 93 |

Examples 3-1 to 3-10

Supposing a case that the raw materials of an argyrodite crystal contain impurities, a sulfide solid electrolyte was produced under the same conditions as in Example 26 except that part of lithium sulfide was replaced by $Na_2S$, $K_2S$, MgS, or CaS. More specifically, a sulfide solid electrolyte of each of Examples 3-1 to 3-10 was obtained in the same manner as in Example 26 except that the mixing ratio etc. of the raw materials were adjusted so that an argyrodite crystal would have a composition ratio shown in Table 8. An $Na_2S$ powder ("2N" produced by Kojundo Chemical Laboratory Co., Ltd.), a $K_2S$ powder ("2Nup" produced by Kojundo Chemical Laboratory Co., Ltd.), an MgS powder ("3N" produced by Kojundo Chemical Laboratory Co., Ltd.), and a CaS powder ("2Nup" produced by Kojundo Chemical Laboratory Co., Ltd.) were used in cases that an argyrodite crystal was to include Na, K, Mg, and Ca, respectively.

In Table 8, R represents at least one element selected from the group consisting of Na, K, Mg, and Ca.

TABLE 8

| | Crystal | | | | | | | | |
|---|---|---|---|---|---|---|---|---|---|
| | | Element ratio | | | | | Lithium ion conductivity | Oxide anion M |
| Example | Composition | Li | P | S | Cl | R | (mS/cm) | Si |
| 3-1 | $Li_{5.37}Na_{9.03}PS_{4.4}Cl_{1.6}$ | 5.37 | 1 | 4.4 | 1.6 | 0.03 | 3.2 | 0.2659 |
| 3-2 | $Li_{5.35}Na_{0.05}PS_{4.4}Cl_{1.6}$ | 5.35 | 1 | 4.4 | 1.6 | 0.05 | 3.5 | 0.2659 |
| 3-3 | $Li_{5.24}Na_{0.16}PS_{4.4}Cl_{1.6}$ | 5.24 | 1 | 4.4 | 1.6 | 0.16 | 3.3 | 0.2659 |
| 3-4 | $Li_{5.37}K_{0.03}PS_{4.4}Cl_{1.6}$ | 5.37 | 1 | 4.4 | 1.6 | 0.03 | 3.0 | 0.2659 |
| 3-5 | $Li_{5.35}K_{0.05}PS_{4.4}Cl_{1.6}$ | 5.35 | 1 | 4.4 | 1.6 | 0.05 | 3.1 | 0.2659 |
| 3-6 | $Li_{5.24}K_{0.16}PS_{4.4}Cl_{1.6}$ | 5.24 | 1 | 4.4 | 1.6 | 0.16 | 3.4 | 0.2659 |
| 3-7 | $Li_{5.37}Ca_{0.01}PS_{4.4}Cl_{1.6}$ | 5.37 | 1 | 4.4 | 1.6 | 0.01 | 2.8 | 0.2659 |
| 3-8 | $Li_{5.35}Ca_{0.03}PS_{4.4}Cl_{1.6}$ | 5.35 | 1 | 4.4 | 1.6 | 0.03 | 3.3 | 0.2659 |
| 3-9 | $Li_{5.24}Ca_{0.08}PS_{4.4}Cl_{1.6}$ | 5.24 | 1 | 4.4 | 1.6 | 0.08 | 2.9 | 0.2659 |
| 3-10 | $Li_{5.35}Mg_{0.03}PS_{4.4}Cl_{1.6}$ | 5.35 | 1 | 4.4 | 1.6 | 0.03 | 3.0 | 0.2659 |

| | | | | | Solid electrolyte | | | |
|---|---|---|---|---|---|---|---|---|
| | Oxide anion | | | | | | | |
| | M | | | | Lithium ion conductivity | (M + O)/(Li + P + S + Ha + R + M + O) | β/(α + β) | D + 0.1 |
| Example | Al | Zr | O | M + O | (mS/cm) | | | |
| 3-1 | | | 0.5318 | 0.7977 | 4.6 | 0.0604 | 0.0604 | 0.1667 |
| 3-2 | | | 0.5318 | 0.7977 | 5.5 | 0.0604 | 0.0604 | 0.1689 |
| 3-3 | | | 0.5318 | 0.7977 | 4.0 | 0.0604 | 0.0604 | 0.1810 |
| 3-4 | | | 0.5318 | 0.7977 | 4.8 | 0.0604 | 0.0604 | 0.1667 |
| 3-5 | | | 0.5318 | 0.7977 | 4.9 | 0.0604 | 0.0604 | 0.1689 |
| 3-6 | | | 0.5318 | 0.7977 | 3.5 | 0.0604 | 0.0604 | 0.1810 |
| 3-7 | | | 0.5318 | 0.7977 | 4.4 | 0.0605 | 0.0605 | 0.1644 |
| 3-8 | | | 0.5318 | 0.7977 | 5.8 | 0.0605 | 0.0605 | 0.1667 |
| 3-9 | | | 0.5318 | 0.7977 | 5.3 | 0.0608 | 0.0608 | 0.1722 |
| 3-10 | | | 0.5318 | 0.7977 | 5.0 | 0.0605 | 0.0605 | 0.1667 |

It is seen from the results of Table 6 that since the sulfide solid electrolyte of each of Examples 1-1 to 1-3 includes an oxide anion having a Q0 structure in a crystal structure, the lithium ion conductivity was higher after the heat treatment of 750° C. and 30 minutes than before it. Among these Examples, the lithium ion conductivity after the heat treatment was particularly high in Examples 1-2 and 1-3 in which the argyrodite crystal contained Cl and Br as Ha and their ratio was adjusted so as to fall within the preferable range.

Furthermore, it is seen from the results of Table 7 that the lithium ion conductivity increased further in the sulfide solid electrolytes of Examples 2-1, 2-2, and 2-3 that were obtained by subjecting the sulfide solid electrolytes of Examples 1-1, 1-2, and 1-3 to the heat treatment of 450° C. and 60 minutes, respectively. That is, it is inferred that the heat treatment provided both advantages of increase in bulk ion conductivity and reduction in grain boundary resistivity. Still further, it was confirmed, from the results of the charging/discharging tests using the all-solid-state lithium-ion secondary battery including the sulfide solid electrolyte of each of Examples 2-1, 2-2, and 2-3, that the capacity retention rate was high and the cycle characteristics were superior in each of Examples 2-1, 2-2, and 2-3. Among these Examples, the cycle characteristics were particularly superior in the sulfide solid electrolyte of each of Examples 2-2 and 2-3 in which the argyrodite crystal contained Cl and Br as Ha, and their ratio was adjusted so as to fall within the preferable range.

Moreover, it is seen from the results of Table 8 that even in the case that the sulfide solid electrolyte contains R, the lithium ion conductivity was higher after the heat treatment of 650° C. and 30 minutes than before it. It was confirmed that the high-temperature stability was increased as in the case that R was not contained.

Although the present invention has been described above in detail with reference to the particular embodiment, it is apparent to those skilled in the art that various changes and modifications are possible without departing from the spirit and scope of the present invention. The present application is based on Japanese Patent Application No. 2020-117194 filed on Jul. 7, 2020, No. 2020-172693 filed on Oct. 13, 2020, and No. 2021-086406 filed on May 21, 2021, the disclosures of which are incorporated herein by reference.

The invention claimed is:

1. A sulfide solid electrolyte, comprising:

a crystal phase; and an anion existing in a crystal structure of the crystal phase, wherein the crystal phase comprises an argyrodite crystal comprising Li, P, S, and Ha;

Ha is a halogen including Cl and Br;

the anion includes an oxide anion having a Q0 structure having an M-O bond that is a bond of M and O;

M is at least one element selected from the group consisting of metal elements and semimetal elements belonging to Groups 2 to 14 of a periodic table; and the silfide solid electrolyte is configured to form an oxide layer at an interface between the solid electrolyte layer and a positive layer when a lithium-ion secondary battery including a solid electrolyte layer including tthe sulfide solid electrolyte is charged and discharged.

2. The sulfide solid electrolyte according to claim 1, wherein contents (at %) of the respective elements satisfy a relationship $\{(M+O)/(Li+P+S+Ha+M+O)\} \leq 0.2$.

3. The sulfide solid electrolyte according to claim 1, wherein when a ratio among contents (at %) of the respective elements contained in the argyrodite crystal is represented by $Li_a$—P—$S_b$-$Ha_c$, relationships $5<a<7$, $4<b<6$, and $0<c<2$ are satisfied.

4. The sulfide solid electrolyte according to claim 1, wherein a sum of contents of the elements Li, P, S, Ha, M, and O is 90 mass % or higher.

5. The sulfide solid electrolyte according to claim 1, wherein M constituting the oxide anion includes at least one element selected from the group consisting of Si, Al, Zr, and B.

6. The sulfide solid electrolyte according to claim 1, wherein the following relational expressions are satisfied when α, β, and γ are defined as $\alpha=(Li+P+S+Ha)$, $\beta=(Si+Al+Zr+B+O)$, and $\gamma=(Ha/P)$ with contents (at %) of the respective elements:

$$0\{\beta/(\alpha+\beta)\}<(D+0.1);\text{ and}$$

$$D=(0.1104\times\gamma-0.1133).$$

7. The sulfide solid electrolyte according to claim 1, wherein when contents of Cl and Br in the argyrodite crystal are represented by x (at %) and y (at %), respectively, x/y is 0.1 or larger and 10 or smaller.

8. The sulfide solid electrolyte according to claim 1, wherein when a ratio among contents (at %) of the respective elements contained in the argyrodite crystal is represented by $Li_a$—P—$S_b$—$Cl_{c1}$—$Br_{c2}$, c1 is 0.1 or larger and 1.5 or smaller and c2 is 0.1 or larger and 1.9 or smaller.

9. The sulfide solid electrolyte according to claim 1, wherein the argyrodite crystal contains at least one element, referred to as R, selected from the group consisting of Na, K, Mg, and Ca, and when a ratio among contents (at %) of the respective elements contained in the argyrodite crystal is represented by $Li_{a1}$-$R_{a2}$—P—$S_b$-$Ha_c$, a2 is in a range of 0.001 to 0.4.

10. A lithium-ion seondary battery comprising the sulfide solid electolyte according to claim 1.

11. The lithium-ion secondary battery according to claim 10, having a capacity retention rate of 80% or higher, the capacity retention rate given by the following equation: (capacity retention rate (%))={(discharge capacity at $100^{th}$ cycle)/(discharge capacity at first cycle)}×100.

* * * * *